United States Patent
Morita et al.

(10) Patent No.: US 9,612,324 B2
(45) Date of Patent: Apr. 4, 2017

(54) MULTI-SECTOR RADAR

(71) Applicant: Panasonic Corporation, Osaka (JP)

(72) Inventors: Tadashi Morita, Kanagawa (JP); Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 287 days.

(21) Appl. No.: 14/583,353

(22) Filed: Dec. 26, 2014

(65) Prior Publication Data

US 2015/0198700 A1 Jul. 16, 2015

(30) Foreign Application Priority Data

Jan. 14, 2014 (JP) .................. 2014-004495

(51) Int. Cl.
   *G01S 13/76* (2006.01)
   *G01S 13/10* (2006.01)
   *G01S 13/28* (2006.01)
   *G01S 7/02* (2006.01)

(52) U.S. Cl.
   CPC ............ *G01S 13/106* (2013.01); *G01S 7/023* (2013.01); *G01S 13/284* (2013.01)

(58) Field of Classification Search
   CPC ....... G01S 13/106; G01S 7/023; G01S 13/284
   USPC .......................................... 342/59, 201–202
   See application file for complete search history.

(56) References Cited

U.S. PATENT DOCUMENTS

| | | | | |
|---|---|---|---|---|
| 3,742,201 A * | 6/1973 | Groginsky | ............ | G06F 17/145 708/410 |
| 4,513,288 A * | 4/1985 | Weathers | .............. | G01S 13/288 342/189 |
| 5,151,702 A * | 9/1992 | Urkowitz | .............. | G01S 13/522 342/116 |
| 5,376,939 A * | 12/1994 | Urkowitz | .................. | G01S 7/42 342/134 |
| 6,404,732 B1 * | 6/2002 | van Nee | ............. | H04J 13/0048 370/209 |
| 6,822,605 B2 * | 11/2004 | Brosche | .................. | G01S 7/282 342/130 |

(Continued)

FOREIGN PATENT DOCUMENTS

JP           61-096482         5/1986

OTHER PUBLICATIONS

C.C.Tseng et al. "Complementary Sets of Sequences" IEEE Transactions on Information Theory, vol. IT-18, No. 5, Sep. 1972.

*Primary Examiner* — Marcus Windrich
(74) *Attorney, Agent, or Firm* — Seed IP Law Group LLP

(57) ABSTRACT

A transmission sequence generated by a first sector radar is a sequence obtained by multiplying a predetermined code sequence by a first orthogonalized code, and a transmission sequence generated by a second sector radar is a sequence obtained by multiplying a predetermined code sequence by a second orthogonalized code. A value obtained by multiplication of the ith element of the first orthogonalized code and the ith element of the second orthogonalized code is equal to the ith element of a fundamental sequence $VV\_2n$ having a length of $2n$ (n is an integer greater than or equal to 1). The fundamental sequence $VV\_2n$ includes a sub fundamental sequence $VV\_2(n-1)$ having a length of n and satisfies $VV\_2n = \{VV\_2(n-1), -VV\_2(n-1)\}$ or $\{-VV\_2(n-1), VV\_2(n-1)\}$.

15 Claims, 15 Drawing Sheets

(56) References Cited

U.S. PATENT DOCUMENTS

| | | | |
|---|---|---|---|
| 7,583,582 B2* | 9/2009 | van Nee | H04J 13/10 370/203 |
| 2013/0176166 A1* | 7/2013 | Kishigami | G01S 7/023 342/202 |
| 2014/0169441 A1* | 6/2014 | Hadani | H04B 1/1027 375/233 |

* cited by examiner

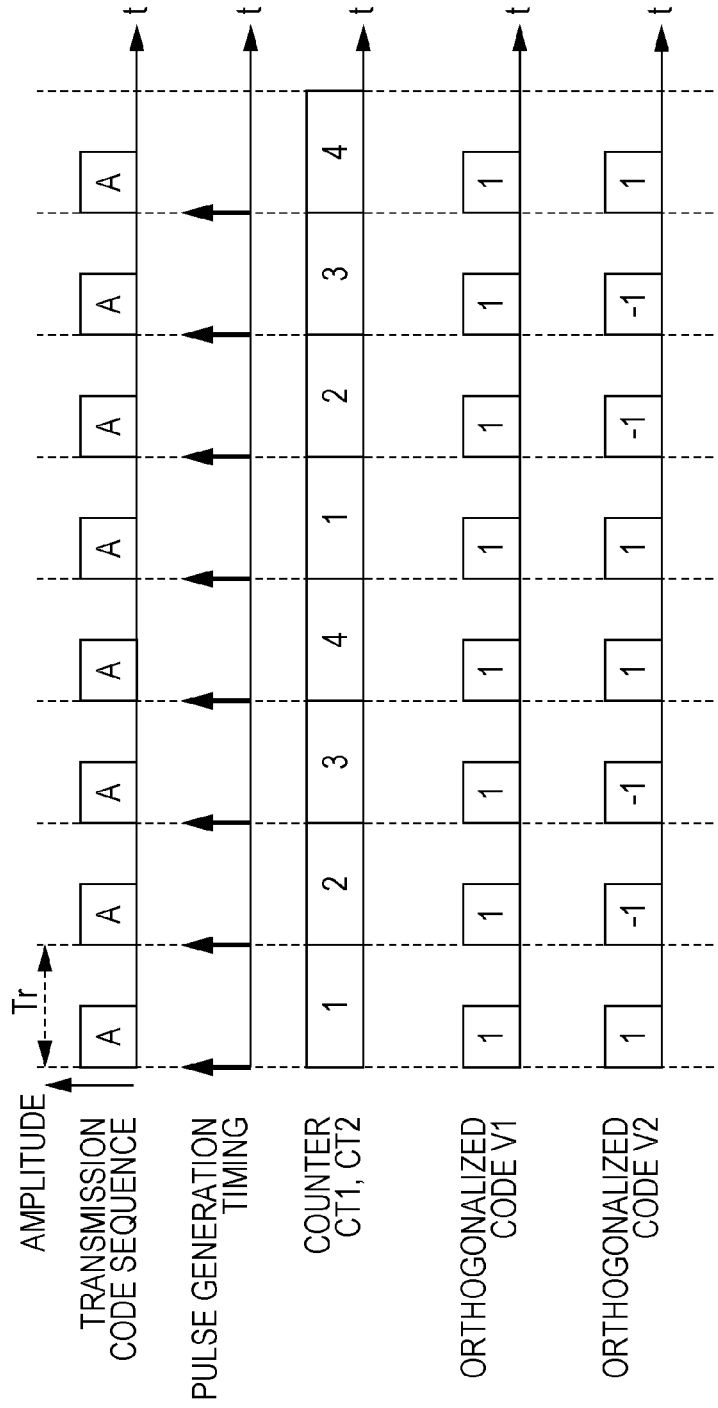

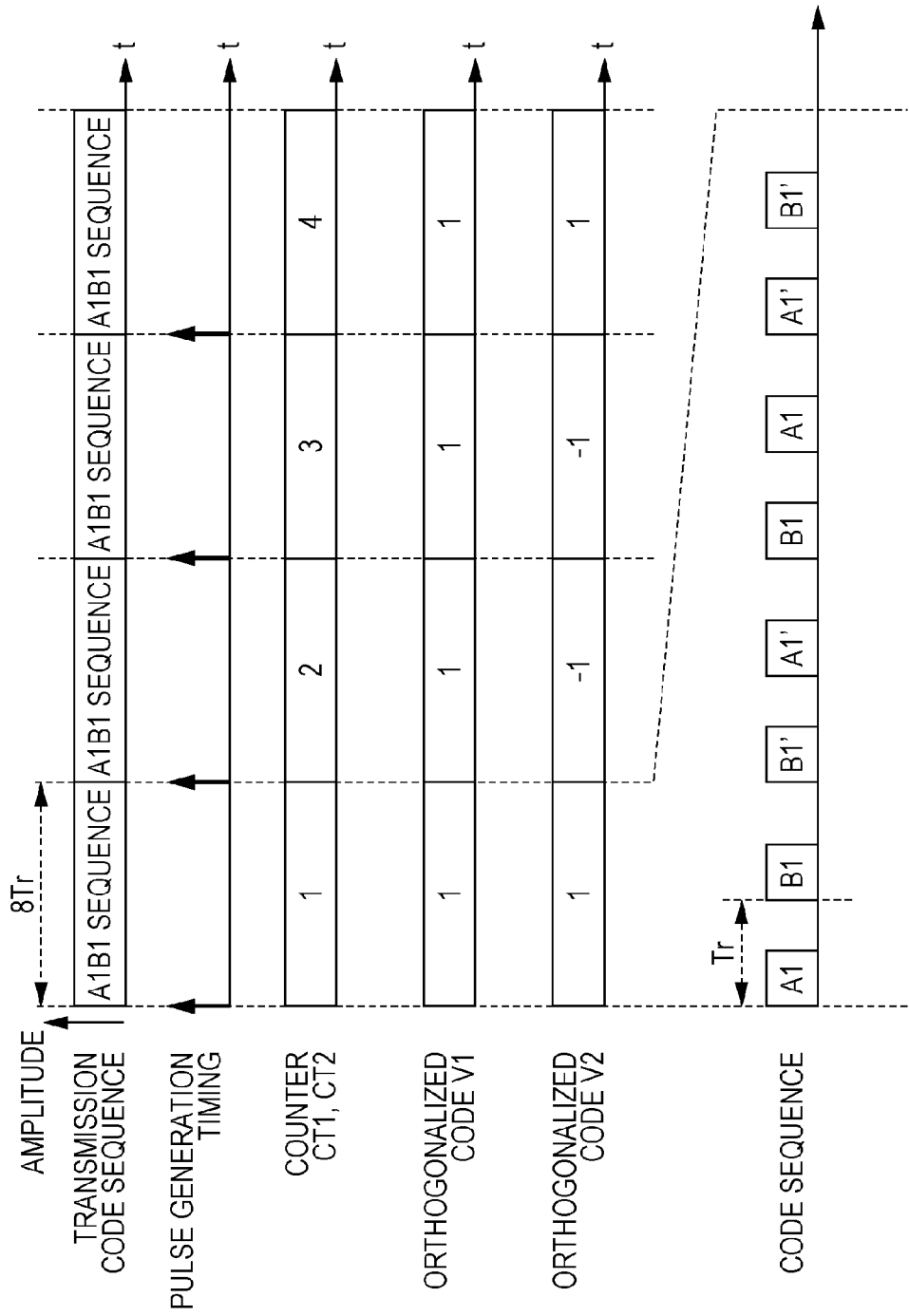

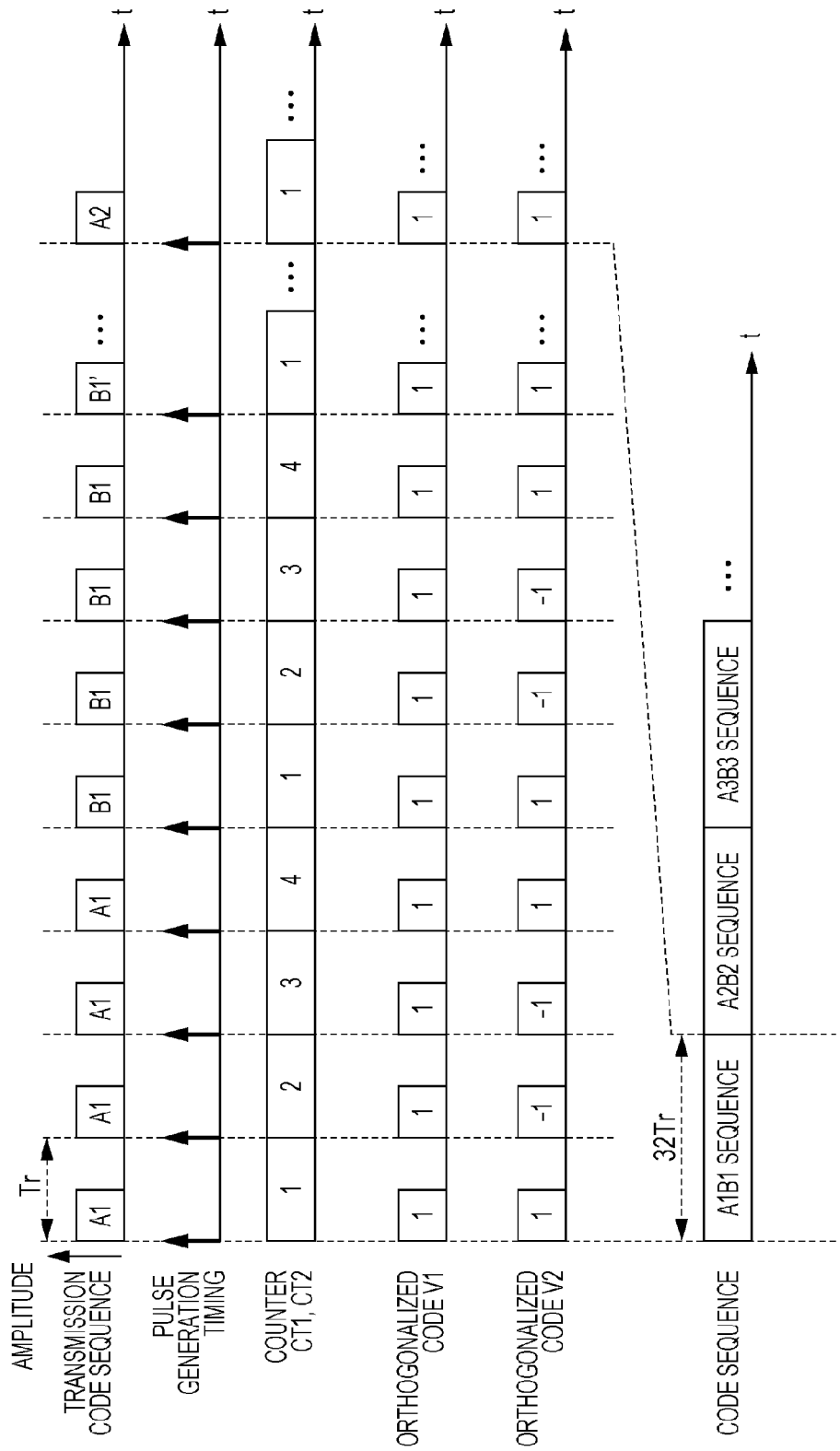

US 9,612,324 B2

MULTI-SECTOR RADAR

CROSS REFERENCES TO RELATED APPLICATIONS

This Application claims priority to Japanese Patent Application No. 2014-004495, filed on Jan. 14, 2014, the contents of which are hereby incorporated by reference.

BACKGROUND

1. Technical Field

The present disclosure relates to a multi-sector radar including a plurality of sector radars that transmit high-frequency signals (e.g., millimeter waves).

2. Description of the Related Art

For detecting the presence/absence of targets (e.g., automobiles or people) in a wide angular range, a measurement method using a plurality of radar devices (each of which is hereinafter referred to as a "sector radar") using code sequences having mathematical orthogonality (see, for example, Complementary Sets of Sequences IEEE TRANSACTIONS ON INFORMATION THEORY, Vol. IT-18, No. 5, September 1972) has been proposed (see, for example, Japanese Unexamined Patent Application Publication No. 61-096482). Japanese Unexamined Patent Application Publication No. 61-096482 discloses, for a plurality of (e.g., two) sector radars, a radar system that suppresses interference between the sector radars by using, as transmission codes, complementary codes having mathematical orthogonality.

The present inventors have studied a multi-sector radar including a plurality of sector radars that transmit high-frequency signals (e.g., in a millimeter wave band). Japanese Unexamined Patent Application Publication No. 61-096482, however, does not consider the operation of the multi-sector radar when phase rotation occurs in reception signals (e.g., when a target moves during measurement) with changes in the Doppler frequency. Thus, the multi-sector radar in the related art has a problem in that, when phase rotation occurs in reception signals with changes in the Doppler frequency, a correlation characteristic of the reception signals deteriorates.

SUMMARY

One non-limiting and exemplary embodiment provides a multi-sector radar that suppresses deterioration of the correlation characteristic of reception signals and that suppresses interference between sector radars by transmitting transmission signals multiplied by predetermined orthogonalized codes, even when phase rotation occurs in reception signals with changes in the Doppler frequency. Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

According to the present disclosure, there is provided a multi-sector radar that includes: a first sector radar including a first transmission-sequence generating unit that generates a first transmission sequence and a first transmitting unit that transmits the first transmission sequence; and a second sector radar including a second transmission-sequence generating unit that generates a second transmission sequence and a second transmitting unit that transmits the second transmission sequence. The first transmission sequence is a sequence obtained by multiplying a first code sequence by a first orthogonalized code. The second transmission sequence is a sequence obtained by multiplying a second code sequence by a second orthogonalized code, an inner product sum of the first orthogonalized code and the second orthogonalized code is zero. A value obtained by multiplication of an ith element of the first orthogonalized code and an ith element of the second orthogonalized code is equal to an ith element of a fundamental sequence $VV\_2n$ having a length of $2n$, where i and n are an integer greater than or equal to 1. The fundamental sequence $VV\_2n$ includes a sub fundamental sequence $VV\_2(n-1)$ having a length of n, and the fundamental sequence $VV\_2n$ is equal to $\{VV\_2(n-1), -VV\_2(n-1)\}$ or $\{-VV\_2(n-1), VV\_2(n-1)\}$. These general and specific aspects may be implemented using a system, a method, and a computer program, and any combination of systems, methods, and computer programs.

According to the present disclosure, it is possible to suppress deterioration of the correlation characteristic of reception signals and it is possible to suppress interference between sector radars by transmitting transmission signals multiplied by predetermined orthogonalized codes, even when phase rotation occurs in reception signals with changes in the Doppler frequency.

BRIEF DESCRIPTION OF THE DRAWINGS

FIG. 3 is one example of a time chart illustrating relationships of transmission code sequences, pulse generation timing, counters, and orthogonalized codes in sector radars in the multi-sector radar in a first embodiment;

FIG. 7 is a time chart illustrating a first example of relationships of transmission code sequences, pulse generation timing, the counters, and orthogonalized codes in the sector radars in the multi-sector radar in a second embodiment;

FIG. 8 is a time chart illustrating a second example of the relationships of transmission code sequences, pulse generation timing, the counters, and the orthogonalized codes in the sector radars in the multi-sector radar in the second embodiment;

DETAILED DESCRIPTION

Embodiments of a multi radar system according to the present disclosure will be described below with reference to the accompanying drawings.

First Embodiment

Figure 1:
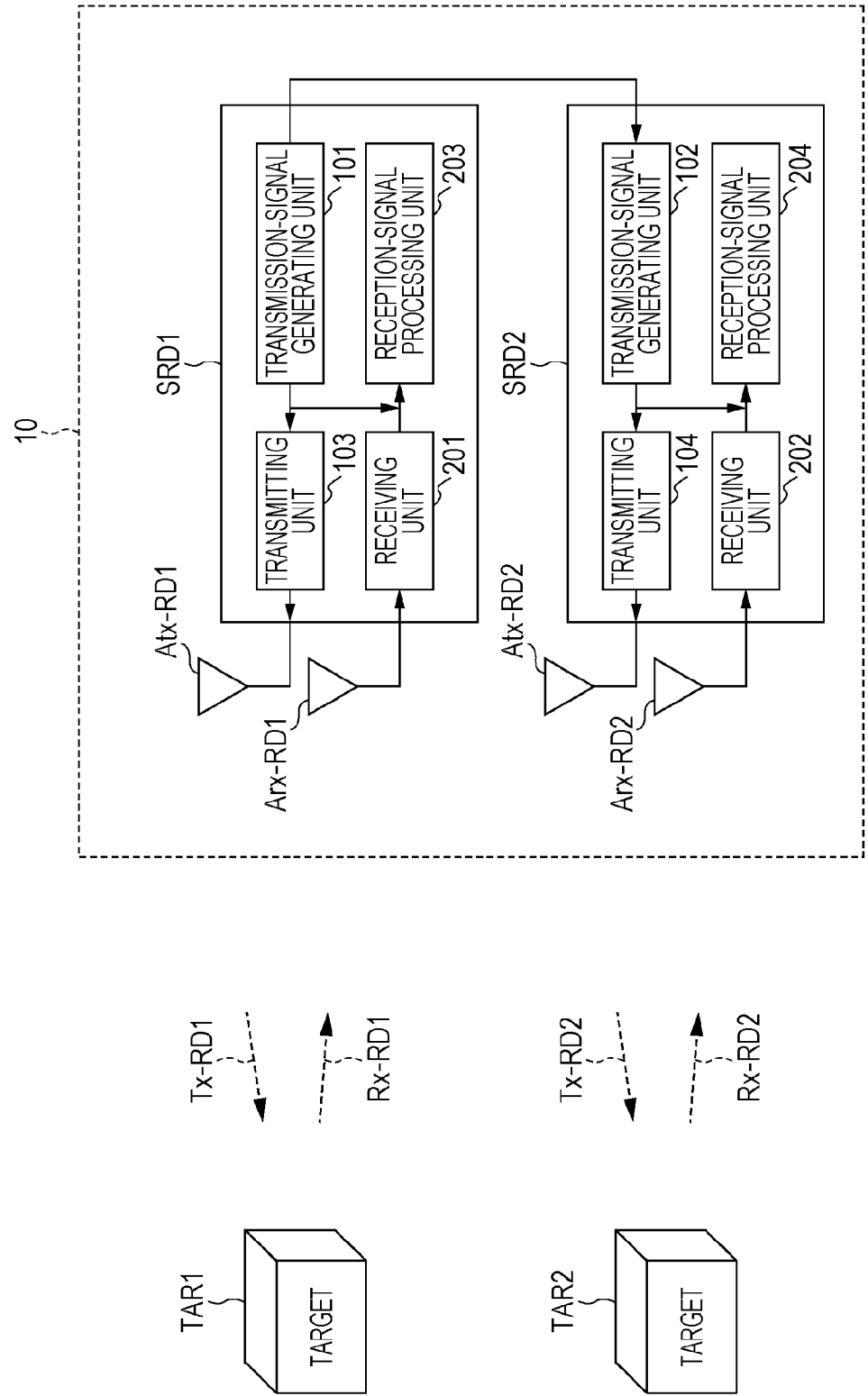
FIG. 1 is a block diagram illustrating the basic configuration of a multi-sector radar in embodiments described herein.

First, the basic configuration of a multi-sector radar 10 in the present embodiment will be described with reference to FIG. 1. FIG. 1 is a block diagram illustrating the basic configuration of the multi-sector radar 10 in embodiments described herein. The multi-sector radar 10 illustrated in FIG. 1 includes a plurality of (e.g., two) sector radars SRD1 and SRD2 and detects the presence/absence of targets TAR1 and TAR2 (e.g., automobiles or people in a wide angular range). The two sector radars SRD1 and SRD2 have the same or similar configurations. Thus, in the embodiments described below, the operations of units in the sector radar SRD1 are described in detail, and the operations of units in the sector radar SRD2 are also described, as needed.

The sector radar SRD1 includes a transmission-signal generating unit 101, a transmitting unit 103 to which a transmission antenna Atx-RD1 is connected, a receiving unit 201 to which a reception antenna Arx-RD1 is connected, and a reception-signal processing unit 203. The sector radar SRD1 transmits radar transmission signals Tx-RD1 via the transmission antenna Atx-RD1 and receives reflection wave signals Rx-RD1, reflected by the target TAR1, via the reception antenna Arx-RD1.

The sector radar SRD2 includes a transmission-signal generating unit 102, a transmitting unit 104 to which a transmission antenna Atx-RD2 is connected, a receiving unit 202 to which a reception antenna Arx-RD2 is connected, and a reception-signal processing unit 204. The sector radar SRD2 transmits radar transmission signals Tx-RD2 via the transmission antenna Atx-RD2 and receives reflection wave signals Rx-RD2, reflected by the target TAR2, via the reception antenna Arx-RD2. The target TAR1 and the target TAR2 may be the same target or may be different targets.

The transmission-signal generating unit 101 is one example of a transmission-sequence generating unit. The transmission-signal generating unit 101 generates a transmission code sequence of the radar transmission signals Tx-RD1 and outputs the transmission code sequence to the transmitting unit 103 and the reception-signal processing unit 203. The transmitting unit 103 converts the transmission code sequence, generated by the transmission-signal generating unit 101, into high-frequency (e.g., a millimeter wave band) radar transmission signals Tx-RD1 and transmits the radar transmission signals Tx-RD1 via the transmission antenna Atx-RD1.

The receiving unit 201 receives the reflection wave signals Rx-RD1 via the reception antenna Arx-RD1, converts the high-frequency reception signals into baseband reception signals, and outputs the baseband reception signals to the reception-signal processing unit 203. The reception-signal processing unit 203 computes a correlation value between the transmission code sequence generated by the transmission-signal generating unit 101 in a transmission period and the reception signals output by the receiving unit 201 and further performs coherent addition on correlation values computed over a predetermined number of transmission periods.

Figure 2:
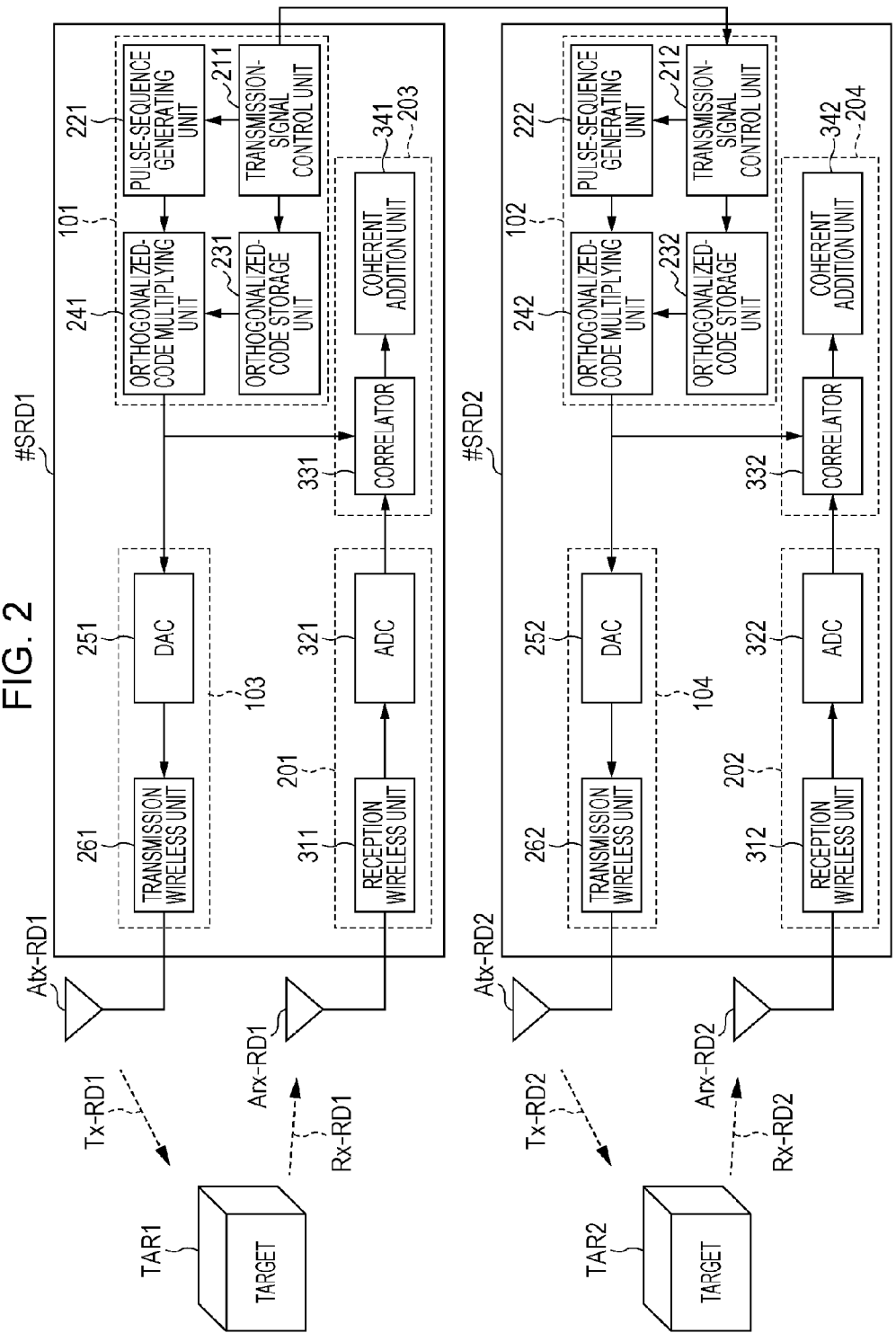
FIG. 2 is a block diagram illustrating a detailed internal configuration of the multi-sector radar in the embodiments.

Next, a detailed internal configuration of the multi-sector radar 10 in the present embodiment will be described with reference to FIG. 2. FIG. 2 is a block diagram illustrating a detailed internal configuration of the multi-sector radar 10 in the embodiments.

The sector radar SRD1 illustrated in FIG. 2 includes a transmission-signal control unit 211, a pulse-sequence generating unit 221, an orthogonalized-code storage unit 231, an orthogonalized-code multiplying unit 241, a digital-to-analog converter (DAC) 251, a transmission wireless unit 261 to which the transmission antenna Atx-RD1 is connected, a reception wireless unit 311 to which the reception antenna Arx-RD1 is connected, an analog-to-digital converter (ADC) 321, a correlator 331, and a coherent addition unit 341.

The transmission-signal generating unit 101 includes the transmission-signal control unit 211, the pulse-sequence generating unit 221, the orthogonalized-code storage unit 231, and the orthogonalized-code multiplying unit 241. The transmitting unit 103 includes the DAC 251 and the transmission wireless unit 261, to which the transmission antenna Atx-RD1 is connected. The receiving unit 201 includes the reception wireless unit 311, to which the reception antenna Arx-RD1 is connected, and the ADC 321. The reception-signal processing unit 203 includes the correlator 331 and the coherent addition unit 341.

The sector radar SRD2 illustrated in FIG. 2 includes a transmission-signal control unit 212, a pulse-sequence generating unit 222, an orthogonalized-code storage unit 232, an orthogonalized-code multiplying unit 242, a DAC 252, a wireless transmitting unit 262 to which the transmission antenna Atx-RD2 is connected, a wireless receiving unit 312 to which the reception antenna Arx-RD2 is connected, an ADC 322, a correlator 332, and a coherent addition unit 342.

The transmission-signal generating unit 102 includes the transmission-signal control unit 212, the pulse-sequence generating unit 222, the orthogonalized-code storage unit 232, and the orthogonalized-code multiplying unit 242. The transmitting unit 104 includes the DAC 252 and the wireless transmitting unit 262, to which the transmission antenna Atx-RD2 is connected. The receiving unit 202 includes the wireless receiving unit 312, to which the reception antenna Arx-RD2 is connected, and the ADC 322. The reception-signal processing unit 204 includes the correlator 332 and the coherent addition unit 342.

The transmission-signal control unit 211 controls the timing at which the pulse-sequence generating unit 221 generates a pulse sequence, which is a transmission code sequence, and the timing at which an orthogonalized code is read in the orthogonalized-code storage unit 231. More specifically, for each predetermined transmission period, the transmission-signal control unit 211 outputs, to the pulse-sequence generating unit 221, a control signal used for generating a pulse sequence and further outputs, to the orthogonalized-code storage unit 231, a control signal used for reading an orthogonalized code V1 (described below) stored by the orthogonalized-code storage unit 231 (see FIG. 3). FIG. 3 is one example of a time chart illustrating details of relationships of transmission code sequences, pulse generation timing, counters CT1 and CT2, and orthogonalized codes V1 and V2 in the sector radars SRD1 and SRD2 in the multi-sector radar 10 in the first embodiment.

The transmission-signal control unit 211 has the counter CT1, and increments (increases) the value of the counter CT1, each time it outputs the control signal used for generating a pulse sequence in one transmission period to the pulse-sequence generating unit 221, that is, in accordance with a pulse generation timing. For example, when the vector length of the orthogonalized codes V1 and V2 described below is 4, the value of the counter CT1 repeats 1, 2, 3, and 4 in this order for each transmission period in accordance with the vector length of the orthogonalized codes V1 and V2. That is, the value of the counter CT1 takes the values 1, 2, 3, 4, 1, . . . , 4.

The transmission-signal control unit 211 also outputs a synchronization signal, which is used for synchronization of the timing at which the sector radar SRD1 transmits the radar transmission signals Tx-RD1 and the timing at which the sector radar SRD2 transmits the radar transmission signals Tx-RD2, to the transmission-signal control unit 212. A similar operation is also performed in each embodiment described below. With this arrangement, the timing at which the radar transmission signals Tx-RD1 are transmitted and the timing at which the radar transmission signals Tx-RD2 are transmitted are synchronized with each other. The timing at which the radar transmission signals Tx-RD1 are transmitted and the timing at which the radar transmission signals Tx-RD2 are transmitted may be the same, or the radar transmission signals Tx-RD2 may be transmitted when a certain period of time passes after the radar transmission signals Tx-RD1 are transmitted.

The pulse-sequence generating unit 221 is one example of a code output unit. The pulse-sequence generating unit 221 generates a predetermined code sequence (e.g., a single pulse sequence A) for each transmission period Tr in accordance with the control signal output by the transmission-signal control unit 211 and outputs the generated code sequence to the orthogonalized-code multiplying unit 241 (see FIG. 3).

The orthogonalized-code storage unit 231 stores therein the orthogonalized code V1 used by the sector radar SRD1 in the multi sector radar 10 in the present embodiment. In addition, the orthogonalized-code storage unit 231 reads elements of the orthogonalized code V1 one-by-one for each transmission period Tr in accordance with the control signal output by the transmission-signal control unit 211 and outputs the read element to the orthogonalized-code multiplying unit 241 (see FIG. 3). The orthogonalized code V1 used by the sector radar SRD1 and an orthogonalized code V2 used by the sector radar SRD2 are described in detail later.

The orthogonalized-code multiplying unit 241 is one example of a multiplying unit. The orthogonalized-code multiplying unit 241 multiplies a transmission code sequence A generated by the pulse-sequence generating unit 221 by the element of the orthogonalized code V1 read by the orthogonalized-code storage unit 231 and outputs a resulting transmission code sequence to the DAC 251 and the correlator 331. For example, in the first transmission period Tr, the orthogonalized-code multiplying unit 241 multiplies a pulse sequence A by the first element {1} of the orthogonalized code V1 (={1, 1, 1, 1}), which is described below, and outputs a resulting transmission code sequence A to the DAC 251.

Similarly, in the second transmission period Tr, the orthogonalized-code multiplying unit 242 in the sector radar SRD2 multiplies the pulse sequence A by the second element {−1} of the orthogonalized code V2 (={1, −1, −1, 1}), which is described below, and outputs a resulting transmission code sequence −A to the DAC 252.

The DAC 251 performs digital-to-analog (D/A) conversion on the digital transmission code sequence (transmission signals) generated by the orthogonalized-code multiplying unit 241 to obtain analog transmission signals and outputs the analog transmission signals to the transmission wireless unit 261. The transmission wireless unit 261 uses a local signal output from a local-signal oscillator (not illustrated) to convert the analog transmission signals output by the DAC 251 into high-frequency radar transmission signals Tx-RD1 and transmits the high-frequency radar transmission signals Tx-RD1 via the transmission antenna Atx-RD1.

The reception wireless unit 311 receives the radar transmission signals Tx-RD1, reflected by the target TAR1, via the reception antenna Arx-RD1 and uses a local signal output from the local-signal oscillator (not illustrated) to convert the high-frequency reception signals received via the reception antenna Arx-RD1 into baseband reception signals (received band signals) and outputs the baseband reception signals to the ADC 321. The ADC 321 performs analog-to-digital (A/D) conversion on the analog baseband reception signals (the received analog baseband signals), generated by the reception wireless unit 311, to obtain digital baseband reception signals (received digital baseband signals) and outputs the digital baseband reception signals to the correlator 331.

For each transmission period, the correlator 331 computes a correlation value (which may be an autocorrelation value) between the transmission code sequence (transmission signals) generated by the orthogonalized-code multiplying unit 241 and the digital reception signals output by the ADC 321 and outputs the correlation value to the coherent addition unit 341. During a number of transmission periods corresponding to a predetermined number of coherent additions (e.g., 100 times), the coherent addition unit 341 performs coherent addition on the correlation values computed by the correlator 331 and measures the distance between the target TAR1 and the sector radar SRD1 on the basis of a time corresponding to a peak correlation value.

Although an example in which each of the sector radars SRD1 and SRD2 illustrated in FIG. 2 has one transmitting unit 103 or 104 to which the corresponding transmission antenna Atx-RD1 or Atx-RD2 is connected and one receiving unit 201 or 202 to which the corresponding reception antenna Arx-RD1 or Arx-RD2 is connected has been described above for ease of description, each of the sector radars SRD1 and SRD2 may have a plurality of transmitting units 103 or 104 and a plurality of receiving units 201 or 202, respectively. For example, sector radars SRD1 and SRD2 that each have a plurality of transmitting units to which the transmission antennas are connected can transmit radar transmission beams with the radar transmission signals Tx-RD1 and Tx-RD2 having directivity in a predetermined direction.

For example, sector radars SRD1 and SRD2 that each have a plurality of receiving units to which the reception antennas are connected and that have arrival-direction estimating units at the subsequent stages of the respective coherent addition units 341 and 342 can compute estimated values of directions from each of the sector radars SRD1 and SRD2 toward the targets TAR1 and TAR2.

In the multi-sector radar 10 in the present embodiment, the reflection wave signals Rx-RD1 of the radar transmission signals Tx-RD1 transmitted by the sector radar SRD1 are received by the sector radars SRD1 and SRD2, and similarly, the reflection wave signals Rx-RD2 of the radar transmission signals Tx-RD2 transmitted by the sector radar SRD2 are received by the sector radars SRD1 and SRD2. In the multi-sector radar 10, when the reflection wave signals Rx-RD1 of the radar transmission signals Tx-RD1 transmitted by one sector radar (e.g., the sector radar SRD1) are received by another sector radar (e.g., the sector radar SRD2), interference signal components can be suppressed using a result of the correlation-value coherent addition performed by the reception-signal processing unit 204.

Next, interference signal components due to a stationary target and interference signal components due to a moving target will be described in contrast to each other by using the orthogonalized codes V1 and V2 that satisfy predetermined requirements (described below) in the embodiments including the present embodiment and orthogonalized codes Va and Vb in a comparative example that does not satisfy the requirements for the orthogonalized codes.

(Interference Signal Components when Orthogonalized Codes Va and Vb in Comparative Example that do not Satisfy Predetermined Requirements are Used)

For example, the sector radar SRD1 uses a vector "1, 1, 1, 1" having a length of 4 as the orthogonalized code Va in the comparative example, the sector radar SRD2 uses a vector "1, −1, 1, −1" having a length of 4 as the orthogonalized code Vb in the comparative example, and each of the sector radars SRD1 and SRD2 uses a pulse sequence A having a code length L of 8 as the transmission sequence. A sector radar in which the orthogonalized code V2 in FIG. 3 is replaced with the orthogonalized code Vb "1, −1, 1, −1" serves as the comparative example that does not satisfy the predetermined requirements.

Since the orthogonalized codes Va and Vb in the comparative example have the relationship that the inner product thereof is zero, equation (1) below is satisfied:

$$\sum_{i=1}^{K} Va(i) \cdot Vb(i) = 0 \quad (1)$$

where i is 1 to K (K is an integer that satisfies K=2n, and n is an integer greater than or equal to 1), Va(i) is the ith element of the orthogonalized code Va, and Vb(i) is the ith element of the orthogonalized code Vb.

For example, in one transmission period, the sector radar SRD1 multiplies a transmission code sequence (a pulse sequence) A by one element of the orthogonalized code Va (="1, 1, 1, 1") to generate a transmission code sequence. Thus, in the first to fourth transmission periods of the sector radar SRD1, transmission code sequences (pulse sequences) "A, A, A, A" are generated. Similarly, in one transmission period, the sector radar SRD2 multiplies a transmission code sequence (a pulse sequence) A by one element of the orthogonalized code Vb (="1, −1, 1, −1") to generate a transmission code sequence. Thus, in the first to fourth transmission periods of the sector radar SRD2, transmission code sequences (pulse sequences) "A, −A, A, −A" are generated.

First, a description will be given of autocorrelation characteristics of the sector radars SRD1 and SRD2 in the case of a stationary target, that is, in a case in which the Doppler frequency does not change and phase rotation in the reception signals does not occur in a static environment.

For example, when a transmission code sequence (transmission signals) transmitted by the sector radar SRD1 is received by the sector radar SRD1, the correlation computation results (the correlation values) of the correlator 331 in the sector radar SRD1 are:
First transmission period: A#A
Second transmission period: A#A
Third transmission period: A#A, and
Fourth transmission period: A#A.

Thus, the output (coherent addition result) of the coherent addition unit 341 in the sector radar SRD1 is 4×(A#A). In this case, # indicates an operator in the correlation computation in the correlator 331 or 332, and A#A indicates a correlation computation result (correlation value) of A and A.

Similarly, when a transmission code sequence (transmission signals) transmitted by the sector radar SRD2 is received by the sector radar SRD2, the correlation computation results (the correlation values) of the correlator 332 in the sector radar SRD2 are:
First transmission period: A#A,
Second transmission period: −A#−A
Third transmission period: A#A, and
Fourth transmission period: −A#−A.

Thus, the output (coherent addition result) of the coherent addition unit 341 in the sector radar SRD1 is 4×(A#A). Thus, even with the multiplication of the pulse sequence A and the orthogonalized codes Va and Vb, the characteristics of the autocorrelation between the transmission code sequences (transmission signals) transmitted by the sector radars SRD1 and SRD2 and the reception signals received by the sector radars SRD1 and SRD2 do not change.

Next, interference signal components of the sector radars SRD1 and SRD2 in the case of a stationary target, that is, in a case in which the Doppler frequency does not change and phase rotation does not occur in the reception signals under a static environment, will be considered.

For example, when a transmission code sequence (transmission signals) transmitted by the sector radar SRD1 is received by the sector radar SRD2, the correlation computation results (the correlation values) of the correlator 332 in the sector radar SRD1 are:
First transmission period: A#A,
Second transmission period: A#−A,
Third transmission period: A#A, and
Fourth transmission period: A#−A.

Thus, the output (coherent addition result) of the coherent addition unit 341 in the sector radar SRD1 becomes zero. Similarly, when a transmission code sequence (transmission signals) transmitted by the sector radar SRD2 is received by the sector radar SRD1, the correlation computation result (the correlation value) in the correlator 331 in the sector radar SRD1 becomes also zero.

For ease of description of each computational result described above, it is assumed that the reflection wave signals of the radar transmission signals transmitted from the sector radar are received by the reception antenna without considering a gain during power amplification before transmission in the sector radar, return loss of transmission signals, decay of reflection wave signals during propagation, and a gain in automatic gain control (AGC) after reception, and this assumption also applies to the description below.

Thus, in the case of a stationary target, that is, in a case in which the Doppler frequency does not change and phase rotation does not occur in the reception signals under a static environment, interference signal components when the local sector radar receives reflection wave signals of radar transmission signals transmitted from another sector radar are cancelled.

Next, a description will be given of interference signal components of the sector radars SRD1 and SRD2 in the case of a moving target, that is, in a case in which the Doppler frequency changes to cause rotation of phase $\phi$ in the reception signals under a dynamic environment. The phase $\phi$ has a value close to zero.

For example, when a transmission code sequence (transmission signals) transmitted by the sector radar SRD1 is received by the sector radar SRD2, the reflection wave signals received by the sector radar SRD2 are:

First transmission period: A,
Second transmission period: $\exp(j\phi)\cdot A$,
Third transmission period: $\exp(j2\phi)\cdot A$, and
Fourth transmission period: $\exp(j3\phi)\cdot A$.

Also, the correlation computation results (the correlation values) of the correlator 332 in the sector radar SRD2 are:

First transmission period: $\cdot A\#A$,
Second transmission period: $\exp(j\phi)\cdot A\#-A$,
Third transmission period: $\exp(j2\phi)\cdot A\#A$, and
Fourth transmission period: $\exp(j3\phi)\cdot A\#-A$.

Thus, the output (coherent addition result) of the coherent addition unit 342 in the sector radar SRD2 is given by equation (2) below:

$$\{1-\exp(j\phi)+\exp(j2\phi)-\exp(j3\phi)\}\cdot(A\#A) \quad (2)$$

Figure 4A:
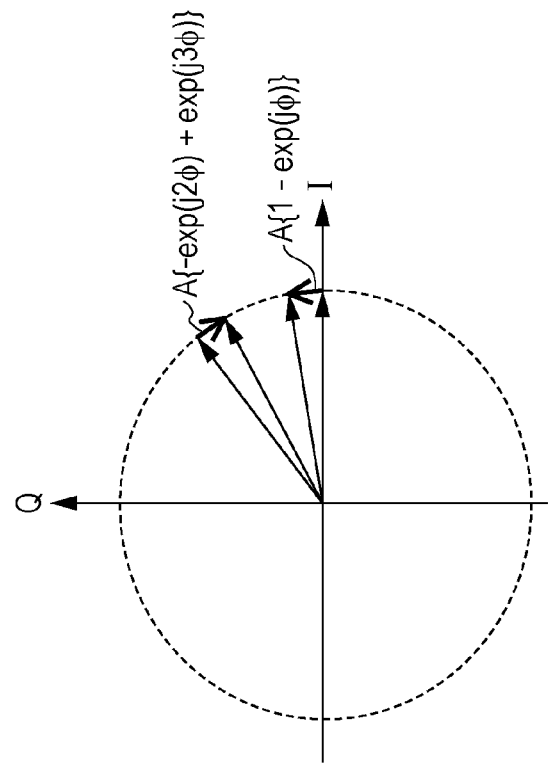
FIG. 4A is an IQ constellation schematically illustrating a vector sum of interference signal components due to orthogonalized codes in a comparative example.

Now, equation (2), that is, the output (coherent addition result) of the coherent addition unit 342 in the sector radar SRD2, will be described with reference to FIG. 4A. FIG. 4A is an in-phase and quadrature (IQ) constellation schematically illustrating a vector sum of the interference signal components due to the orthogonalized codes Va and Vb in the comparative example.

In equation (2), $(1-\exp(j\phi)\cdot(A\#A)$ represents an interference signal component in each of the first and second transmission periods, and $(\exp(j2\phi)-\exp(j3\phi)-(A\#A)$ represents an interference signal component in each of the third and fourth transmission periods. In the IQ constellation illustrated in FIG. 4A, the interference signal component in each of the first and second transmission periods and the interference signal component in each of the third and fourth transmission periods are vectors pointing in the same direction. The "vectors pointing in the same direction" are vectors that can obtain the effects in the present embodiment, as long as a difference is within a predetermined range.

Accordingly, in the case of a moving target, that is, in a case in which the Doppler frequency changes to cause a rotation of phase $\phi$ in the reception signals under a dynamic environment, the interference signal components in the sector radars using the orthogonalized codes Va and Vb in the comparative example increases as the number of coherent additions increases.

(Interference Signal Components when Orthogonalized Codes V1 and V2 that Satisfy Predetermined Requirements are Used)

First, a description will be given of predetermined requirements for the orthogonalized codes V1 and V2 used by the sector radars SRD1 and SRD2 in the multi-sector radar 10 in the embodiments including the present embodiment.

The orthogonalized code V1 is a vector having a length of K, and the orthogonalized code V2 is a vector having a length of K. The orthogonalized codes V1 and V2 satisfy equation (1), similarly to the orthogonalized codes Va and Vb in the comparative example. In the embodiments including the present embodiment, a fundamental sequence (fundamental vector) VV_K is defined in order to describe the predetermined requirements for the orthogonalized codes V1 and V2.

The ith element VV_K(i) of the fundamental sequence VV_K is a value obtained by multiplication of the ith element V1($i$) of the orthogonalized code V1 and the ith element V2($i$) of the orthogonalized code V2, as in equation (3) below:

$$VV\_K(i)=V1(i)\times V2(i) \quad (3)$$

Thus, when the fundamental sequence VV_K (=VV_1) for K=1 is {1} or {-1},
the fundamental sequence VV_K for K=2 is VV_2={VV_1, -VV_1}={1, -1} or {-1, 1}, and the fundamental sequence VV_K for K=4 is VV_4={VV_2, -VV_2}={1, -1, -1, 1} or {-1, 1, 1, -1}. Therefore, the fundamental sequence VV_K (=VV_2n) when K is 2 or more satisfies equation (4):

$$VV\_2n=\{VV\_n,-VV\_n\} \quad (4)$$

In the present embodiment, the orthogonalized codes V1 and V2, each having a length of 4 (K=4, n=2), are described as being the orthogonalized codes V1={1, 1, 1, 1} and V2={1, -1, -1, 1} that satisfy equation (4), as illustrated in FIG. 3, but the orthogonalized codes V1 and V2 are not limited to {1, 1, 1, 1} and {1, -1, -1, 1} and may be any codes that satisfy equation (4). For example, the orthogonalized code V1 may be {1, -1, -1, 1}, and the orthogonalized code V2 may be {1, 1, 1, 1}.

Now, a description will be given of interference signal components when a transmission code sequence (transmission signals) transmitted by the sector radar SRD1 is received by the sector radar SRD2, in the case of a moving target, that is, in a case in which the Doppler frequency changes to cause a rotation of phase $\phi$ in the reception signals under a dynamic environment. The phase $\phi$ has a value close to zero.

For example, when a transmission code sequence (transmission signals) transmitted by the sector radar SRD1 is received by the sector radar SRD2, the reflection wave signals received by the sector radar SRD2 are:

First transmission period: $1\cdot A$,
Second transmission period: $\exp(j\phi)\cdot A$,
Third transmission period: $\exp(j2\phi)\cdot A$, and
Fourth transmission period: $\exp(j3\phi)\cdot A$.

Also, the correlation computation results (the correlation values) of the correlator 332 in the sector radar SRD2 are:
First transmission period: A#A,
Second transmission period: $\exp(j\phi) \cdot A\# -A$,
Third transmission period: $\exp(j2\phi) \cdot A\# -A$, and
Fourth transmission period: $\exp(j3\phi) \cdot A\#A$.
Thus, the output (coherent addition result) of the coherent addition unit 342 in the sector radar SRD2 is given by equation (5):

$$\{1-\exp(j\phi)-\exp(j2\phi)+\exp(j3\phi)\} \cdot (A\#A) \quad (5)$$

Figure 4B:
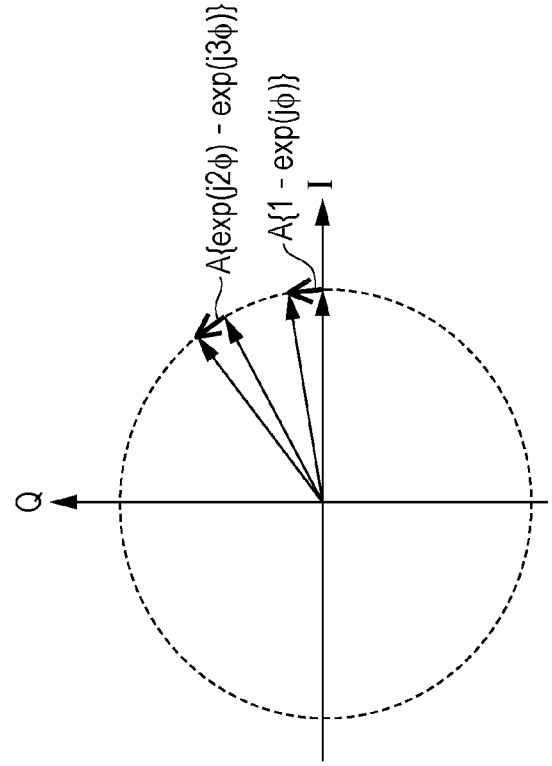
FIG. 4B is an IQ constellation schematically illustrating a vector sum of interference signal components due to orthogonalized codes in the present embodiment.

Now, equation (5), that is, the output (coherent addition result) of the coherent addition unit 342 in the sector radar SRD2, will be described with reference to FIG. 4B. FIG. 4B is an IQ constellation schematically illustrating a vector sum of interference signal components due to the orthogonalized codes V1 and V2 in the present embodiment.

In equation (5), $(1-\exp(j\phi))-(A\#A)$ represents an interference signal component in each of the first and second transmission periods, and $(-\exp(j2\phi)+\exp(j3\phi)) \cdot (A\#A)$ represents an interference signal component in each of the third and fourth transmission periods. In the IQ constellation illustrated in FIG. 4B, the interference signal component in each of the first and second transmission periods and the interference signal component in each of the third and fourth transmission periods are vectors pointing in opposite directions and cancel each other out.

Thus, through the use of the orthogonalized codes V1 and V2 in the present embodiment in the case of a moving target, that is, in a case in which the Doppler frequency changes to cause a rotation of phase $\phi$ in the reception signals under a dynamic environment, the sector radar can suppress more interference signal components as the number of coherent additions increases.

A specific comparison is made between the interference signal components due to the orthogonalized codes Va and Vb in the comparative example and the interference signal components due to the orthogonalized codes V1 and V2 in the present embodiment.

For example, when the phase rotation $\phi$ in equation (2) is 1 degree, the interference signal component (a coefficient by which (A#A) is multiplied) due to the orthogonalized codes Va and Vb in the comparative example is ([1, 0]−[cos 1°, sin 1°]+[cos 2°, sin 2°]−[cos 3°, sin 3°])=([0.0009136, −0.0349]). Thus, the magnitude of the interference signal component is 0.0349= $\{(0.0009136)^2+(-0.0349)^2\}^{1/2}$.

On the other hand, when the phase rotation $\phi$ in equation (5) is 1 degree, the interference signal component due to the orthogonalized codes V1 and V2 in the present embodiment is:

([1,0]−[cos 1°, sin 1°]−[cos 2°, sin 2°]+[cos 3°, sin 3°])=([−0.00060899,−0.0000015947]).

Thus, the magnitude of the interference signal component is 0.0006092.

Accordingly, since the sector radars SRD1 and SRD2 use the orthogonalized codes V1 and V2, the multi-sector radar 10 in the present embodiment can improve the effect of suppressing the interference signal components in the coherent addition results in the coherent addition units 341 and 342 by 20×log (0.0349/0.0006092)=35 [dB], compared with the orthogonalized codes Va and Vb in the comparative example.

Although the above description has been given of a case in which the transmission code sequence A generated by each of the pulse-sequence generating units 221 and 222 in the present embodiment is one pulse sequence, the transmission code sequence A is not limited to a single pulse sequence and may be, for example, a complementary code sequence. This also applies to each embodiment described below (see FIGS. 5A and 5B).

Figure 5A:
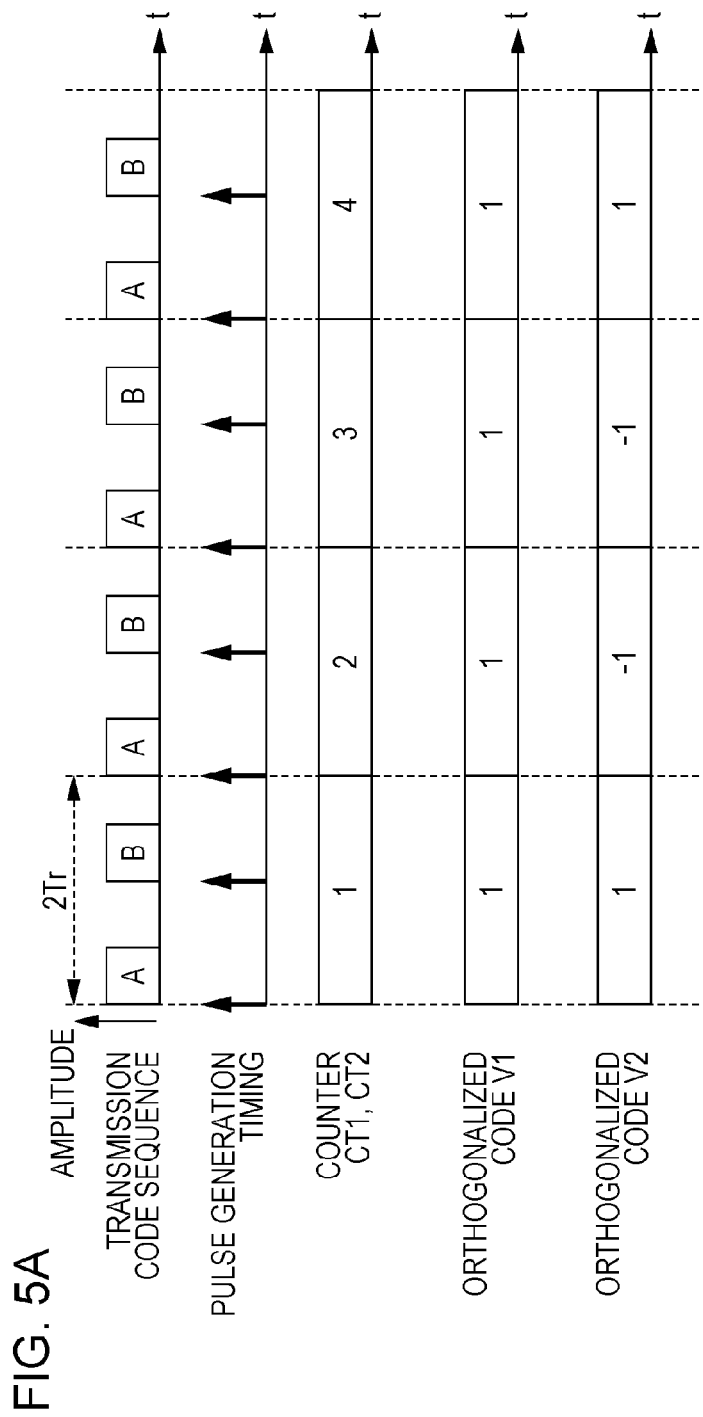
FIG. 5A is a time chart illustrating relationships of transmission code sequences, pulse generation timing, the counters, and orthogonalized codes in the sector radars using complementary code sequences as the transmission code sequences.
Figure 5B:
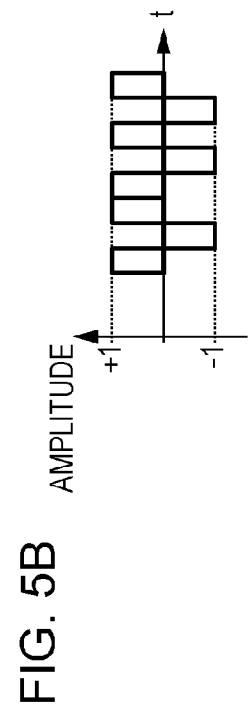
FIG. 5B is a waveform diagram illustrating changes in the amplitude of the code sequences with time.

FIG. 5A is a time chart illustrating relationships of transmission code sequences, pulse generation timing, the counters CT1 and CT2, and orthogonalized codes V1 and V2 in the sector radars using complementary code sequences as the transmission code sequences. FIG. 5B is a waveform diagram illustrating changes in the amplitude of the code sequences with time. Since the vector length of the orthogonalized codes V1 and V2 is 4, the value of the counter CT1 repeats 1, 2, 3, and 4 in this order in accordance with the vector length of the orthogonalized codes V1 and V2.

A complementary code is, for example, a code using a pair of (i.e., two) complementary code sequences (A and B) and is, for example, a code sequence including {+1} and {−1} (see FIG. 5B). A complementary code has the property that addition of autocorrelation values with delay times τ [second] being matched in the correlation computation results of one complementary code sequence A and another complementary code sequence B allows sidelobes, except for the peak value of the autocorrelation value, to become zero.

In FIG. 5A, using two transmission periods for the transmission code sequences as a unit, the transmission-signal control unit 211 causes the pulse-sequence generating unit 221 to generate one code sequence (e.g., the code sequence A) of the complementary code sequences (A and B) in the first transmission period and causes the pulse-sequence generating unit 221 to generate the other code sequence (e.g., the code sequence B) of the complementary code sequences (A and B) in the second transmission period. For every two transmission periods, that is, for every two pulse-generation timings, the transmission-signal control unit 211 increments the value of the counter CT1 and multiplies the two code sequences A and B by one element (e.g., {+1} or {−1}) of the orthogonalized code V1. Since the transmission-signal control unit 212 also operates in a similar manner, a description thereof is not given hereinafter.

With this arrangement, the multi-sector radar 10 in the present embodiment can maintain the superior sidelobe suppression characteristic of the complementary code sequences, that is, the superior characteristic of suppression of sidelobes in the coherent addition results in the coherent addition units 341 and 342, and can suppress interference signal components from another sector radar.

The code sequence generated by the pulse-sequence generating units 221 and 222 in the present embodiment may also be a chirp signal (e.g., a frequency-modulated continuous-wave (FMCW)), besides a single pulse sequence or a complementary code sequence, and this also applies to each embodiment described below (see FIG. 6A).

Figure 6A:
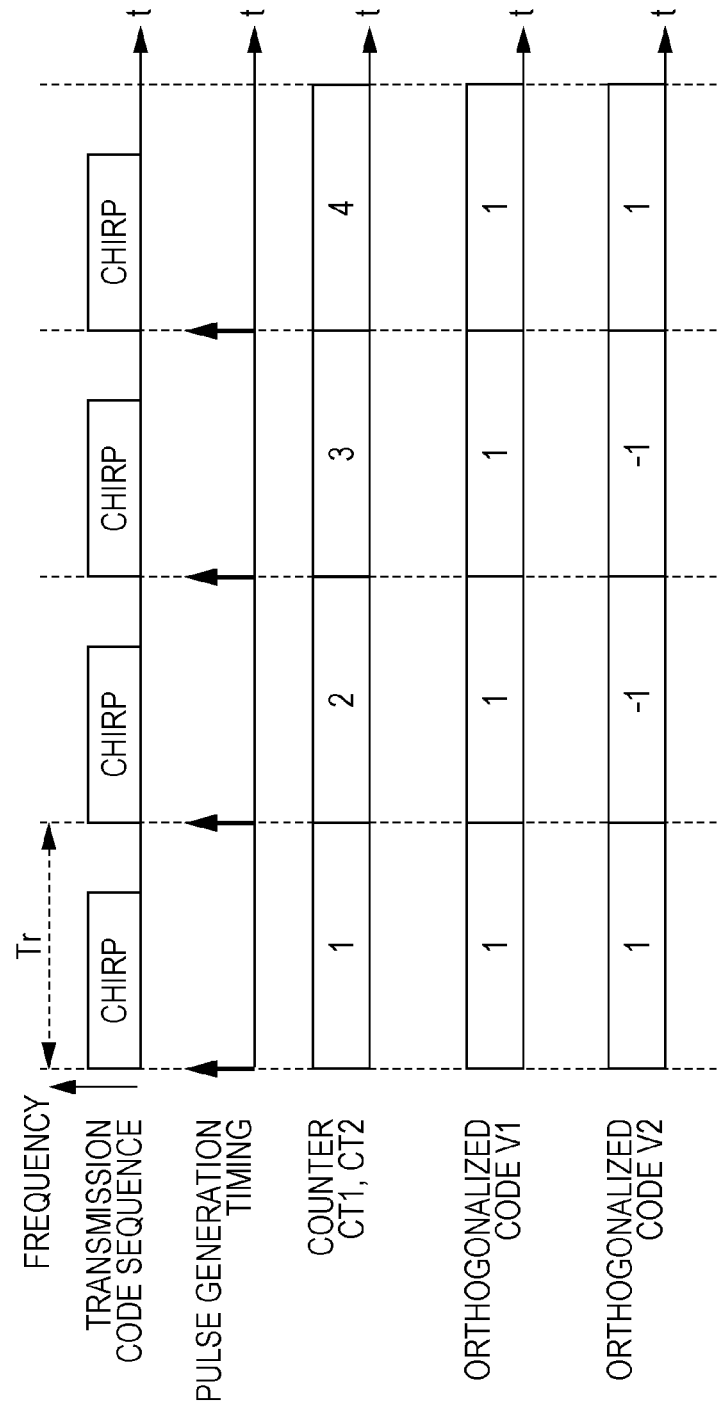
FIG. 6A is a time chart illustrating relationships of transmission code sequences, pulse generation timing, the counters, and orthogonalized codes in the multi-sector radar using a chirp signal as the transmission code sequence.
Figure 6B:
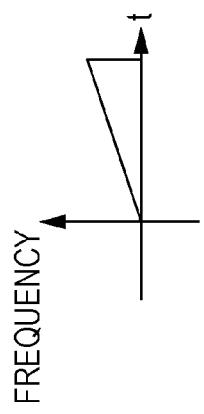
FIG. 6B is a waveform diagram illustrating changes in the frequency of a chirp signal with time.

FIG. 6A is a time chart illustrating details of relationships of transmission code sequences, pulse generation timing, the counters CT1 and CT2, and orthogonalized codes V1 and V2 in the multi-sector radar using a chirp signal as the transmission code sequence. FIG. 6B is a waveform diagram illustrating changes in the frequency of a chirp signal with time. Since the code length of the orthogonalized codes V1 and V2 is 4, the value of the counter CT1 repeats 1, 2, 3, and 4 in this order in accordance with the code length of the orthogonalized codes V1 and V2. The chirp signal is a signal in which the frequency changes continuously from one frequency to another frequency with time (see FIG. 6B).

In FIG. 6A, the transmission-signal control unit 211 causes the pulse-sequence generating unit 221 to generate a chirp signal in a predetermined period in a transmission period, increments the value of the counter CT1 for each transmission period, and multiplies one chirp signal by one element (e.g., {+1} or {−1}) of the orthogonalized code V1. Since the transmission-signal control unit 212 also operates in a similar manner, a description thereof is not given hereinafter.

With this arrangement, the multi-sector radar 10 in the present embodiment can suppress interference signal components from another sector radar, similarly to the multi-sector radar using a single pulse sequence as the transmission code sequence.

In the present embodiment, two transmission code sequences generated by the pulse-sequence generating units 221 and 222 in the sector radars SRD1 and SRD2 may be the same code sequence or may be different code sequences. For example, for the same code sequence, a correlated-output characteristic can be obtained for outputs of the correlators 331 and 332 in the sector radars SRD1 and SRD2. However, since the transmission code sequence is multiplied by the orthogonalized codes V1 and V2, interference signal components are suppressed.

For different code sequences or two transmission code sequences that are unrelated, the outputs of the correlator 331 and 332 in the sector radars SRD1 and SRD2 in the multi-sector radar 10 become small. Thus, the multiplication of the transmission code sequences by the corresponding orthogonalized codes V1 and V2 makes it possible to suppress interference signal components, compared with the case of the same code sequence. The code sequence A and the code sequence B being uncorrelated means that, for example, all elements of the correlation value (A#B) of the code sequence A and the code sequence B become zero.

Second Embodiment

It is preferable that the multi-sector radar 10 use Spano codes as transmission code sequences in order to achieve a more superior sidelobe suppression characteristic than the suppression characteristic of sidelobes in the coherent addition results in the coherent addition units 341 and 342.

In a second embodiment, a description will be given of an example of the multi-sector radar 10 using Spano codes for the transmission code sequences. Of the operations of the multi-sector radar 10 in the present embodiment, the same details as those of the operation of the multi-sector radar 10 in the first embodiment are not described or are briefly described, and different details will be described.

Spano codes are code sequences including code sequences A and B that constitute complementary code sequences (A and B) and reversed-order code sequences A' and B' of the code sequences A and B. Compared with the multi-sector radar using complementary codes, a multi-sector radar using Spano codes provides a favorable sidelobe suppression characteristic, even under an environment in which the Doppler frequency changes. Examples of the Spano codes include eight code sequences arranged in the order (A, B, B', A', B, A, A', B'). The code sequences A and B are complementary codes, and the code sequences A' and B' are also complementary codes. Eight code sequences arranged in the order (A, B, B, A, B, A, A, B) are also Spano codes.

The Spano codes are not limited to eight code sequences (A, B, B', A', B, A, A', B') and may be four code sequences (A, B, B, A). In addition, the Spano codes may also be a plurality of (e.g., n) sets of eight code sequences (A, B, B', A', B, A, A', B'), that is, (A1, B1, B1', A1', B1, A1, A1', B1'), (A2, B2, B2', A2', B2, A2, A2', B2'), . . . , and (An, Bn, Bn', An', Bn, An, An', Bn').

In the present embodiment, there are two methods for the multi-sector radar 10 to multiply the Spano code, which is a transmission code sequence, by the orthogonalized codes V1 and V2. In the first multiplication method, for example, when the Spano codes are eight code sequences (A1, B1, B1', A1', B1, A1, A1', B1'), the multi-sector radar 10 multiplies all of the eight code sequences (A1, B1, B1', A1', B1, A1, A1', B1') by one element of the orthogonalized code V1 or V2 for every eight transmission periods (see FIG. 7).

In the second multiplication method, for example, when the Spano codes are eight code sequences (A1, B1, B1', A1', B1, A1, A1', B1'), the multi-sector radar 10 repeatedly multiplies one code sequence by one element of the corresponding orthogonalized codes V1 and V2, for example, four times, which number is the same as the vector length (e.g., 4) of the orthogonalized codes V1 and V2 (see transmission code sequences in FIG. 8).

(First Multiplication Method for Spano Codes and Orthogonalized Codes V1 and V2)

First, the first multiplication method for the Spano codes and the orthogonalized codes V1 and V2 will be described with reference to FIG. 7. FIG. 7 is a time chart illustrating a first example of relationships of transmission code sequences, pulse generation timing, the counters CT1 and CT2, and orthogonalized codes V1 and V2 in the sector radars SRD1 and SRD2 in the multi-sector radar 10 in the second embodiment. Although the operation of the sector radar SRD1 is described for ease of description in FIG. 7, the sector radar SRD2 also operates in a similar manner.

For every eight transmission periods, the transmission-signal control unit 211 outputs, to the pulse-sequence generating unit 221, a control signal for causing one code sequence of A1B1-sequence Spano codes (A1, B1, B1', A1', B1, A1, A1', B1') to be sequentially generated in each transmission period. In addition, for every eight transmission periods, the transmission-signal control unit 211 outputs, to the orthogonalized-code storage unit 231, a control signal for causing the orthogonalized code V1 stored by the orthogonalized-code storage unit 231 to be output (see FIG. 7). In the present embodiment, the orthogonalized codes V1 and V2 are vectors {1, 1, 1, 1} and {1, −1, −1, 1}, each having a length of 4, as in the first embodiment.

Each time the transmission-signal control unit 211 outputs, to the pulse-sequence generating unit 221, a control signal for causing Spano codes to be generated in the eight transmission periods, the transmission-signal control unit 211 increments the value of the counter CT1. For example, when the vector length of the orthogonalized codes V1 and V2 is 4, the value of the counter CT1 repeats 1, 2, 3, and 4 in this order for every eight transmission periods in accordance with the vector length of the orthogonalized codes V1 and V2.

In the present embodiment, the pulse-sequence generating unit 221 has a read only memory (ROM) in which L/4 sets of Spano codes, each set being composed of eight code sequences (A, B, B', A', B, A, A', B'), are stored (where L indicates the code length of the Spano code).

The L/4 sets of Spano codes include:

First Spano code set: eight code sequences (A1, B1, B1', A1', B1, A1, A1', B1'), Second Spano code set: eight code sequences (A2, B2, B2', A2', B2, A2, A2', B2'), and . . . , Pth Spano code set: eight code sequences (AP, BP1, BP', AP', BP, AP, AP', BP').

In this case, P is L/4.

In response to the control signal output by the transmission-signal control unit 211, the pulse-sequence generating unit 221 reads, for example, the eight code sequences (A1, B1, B1', A1', B1, A1, A1', B1'), which are the first Spano code set, and outputs the read eight code sequences to the orthogonalized-code multiplying unit 241 for every eight transmission periods (i.e., for each 8Tr). For each transmission period, the pulse-sequence generating unit 221 reads one code sequence in the order of, for example, the eight code sequences (A1, B1, B1', A1', B1, A1, A1', B1'), which are the first Spano code set, and outputs the read code sequence to the orthogonalized-code multiplying unit 241.

In the eight transmission periods, the orthogonalized-code multiplying unit 241 multiplies, for example, the eight code sequences (A1, B1, B1', A1', B1, A1, A1', B1'), which are the first (counter CT1=1) Spano code set, by one element of the orthogonalized code V1 read by the orthogonalized-code storage unit 231. In FIG. 7, in the first (counter CT=1) eight transmission periods (8Tr), the orthogonalized-code multiplying unit 241 multiplies, for example, the eight code sequences (A1, B1, B1', A1', B1, A1, A1', B1'), which are the first Spano code set, by the first element {+1} of the orthogonalized code V1.

Similarly, in the fourth (counter CT1=4) eight transmission periods (8Tr) after processing for the counter CT=2 and the counter CT=3 is finished, the orthogonalized-code multiplying unit 241 multiplies, for example, the eight code sequences (A1, B1, B1', A1', B1, A1, A1', B1'), which are the first Spano code set, by the fourth element {+1} of the orthogonalized code V1.

In the next eight transmission periods (8Tr) after the fourth (counter CT1=4) eight transmission periods (8Tr), the orthogonalized-code multiplying unit 241 also multiplies, for example, the eight code sequences (A2, B2, B2', A2', B2, A2, A2', B2'), which are the second Spano code set, by the first element {+1} of the orthogonalized code V1.

Thereafter, similarly, for every eight transmission periods, the orthogonalized-code multiplying unit 241 in the sector radar SRD1 repeats the multiplication of eight code sequences, which are a Spano code set, and any element of the orthogonalized code V1. Since the operations of the transmission-signal control unit 212, the pulse-sequence generating unit 222, and the orthogonalized-code multiplying unit 242 in the sector radar SRD2 are also analogous to those of the transmission-signal control unit 211, the pulse-sequence generating unit 221, and the orthogonalized-code multiplying unit 241 in the sector radar SRD1, descriptions thereof are not given hereinafter.

With the arrangement described above, according to the first multiplication method, the sidelobe suppression characteristic in the local sector radar in the multi-sector radar 10 improves by using the eight code sequences, which are a Spano code set, as illustrated in FIG. 7, and since the code sequences are multiplied by the corresponding orthogonalized codes V1 and V2, interference signals due to another sector radar can be suppressed, as in the first embodiment. In addition, since the same code sequence is not arranged continuously among the eight code sequences used by the local sector radar, it is possible to further reduce the inter-range interference, compared with the second multiplication method described below.

In this case, since the code sequence A1 and the code sequence A1 are correlated and the code sequence A1 and the code sequence B1 are uncorrelated, the correlation value A1#B1 is smaller than the correlation value A1#A1. Thus, for example, when the target is located far away from the sector radars, the continuous use of the same code sequence, as in FIG. 3, causes occurrence of inter-range interference signal components in each sector radar, when the multi-sector radar 10 receives reflection wave signals across transmission periods Tr of the sector radar.

Thus, the multi-sector radar 10 cyclically uses the code sequences that are not correlated or that are uncorrelated, as in FIG. 7, to thereby make it possible to suppress interference signal components between ranges, even when each sector radar receives reflection wave signals from itself across transmission periods Tr.

(Second Multiplication Method for Spano Codes and Orthogonalized Codes V1 and V2)

Next, the second multiplication method for the Spano codes and the orthogonalized codes V1 and V2 will be described with reference to FIG. 8. FIG. 8 is a time chart illustrating a second example of the relationships of the transmission code sequences, the pulse generation timing, the counters CT1 and CT2, and the orthogonalized codes V1 and V2 in the sector radars SRD1 and SRD2 in the multi-sector radar 10 in the second embodiment. Although the operation of the sector radar SRD1 is described for ease of description in FIG. 8, the sector radar SRD2 also operates in a similar manner, and the same details as those of the first multiplication method are not described or are briefly described, and different details will be described.

For each transmission period, the transmission-signal control unit 211 outputs, to the pulse-sequence generating unit 221, a control signal for causing the same code sequence of the eight code sequences of the A1B1-sequence Spano codes (A1, B1, B1', A1', B1, A1, A1', B1') to be generated a predetermined number of times. The predetermined number of times is, for example, a value (e.g., "4" in FIG. 8) that is the same as the vector length of the orthogonalized code V1.

That is, the transmission code sequences are:
(A1, A1, A1, A1,
B1, B1, B1, B1,
B1', B1', B1', B1',
A1', A1', A1', A1',
B1, B1, B1, B1,
A1, A1, A1, A1,
A1', A1', A1', A1',
B1', B1', B1', B1').

In addition, for each transmission period, the transmission-signal control unit 211 outputs, to the orthogonalized-code storage unit 231, a control signal used for reading the orthogonalized code V1 stored by the orthogonalized-code storage unit 231 (see FIG. 8). In the present embodiment, the orthogonalized codes V1 and V2 are vectors {1, 1, 1, 1} and {1, −1, −1, 1}, each having a length of 4, as in the first embodiment.

Each time the transmission-signal control unit 211 outputs the control signal, used for generating a pulse sequence in which the same code sequence of the eight code sequences of Spano codes is repeated a predetermined number of times, to the pulse-sequence generating unit 221 for each transmission period, the transmission-signal control unit 211 increments the value of the counter CT1. For example, when the vector length of the orthogonalized codes V1 and V2 is 4, the value of the counter CT1 repeats 1, 2, 3, and 4 in this order for every four transmission periods in accordance with the vector length of the orthogonalized codes V1 and V2.

In the first transmission period to the fourth transmission period, in accordance with the control signal output by the pulse-sequence generating unit 221 and used for generating a pulse sequence, the transmission-signal control unit 211 reads, for example, the first code sequence A1 of the eight code sequences (A1, B1, B1', A1', B1, A1, A1', B1'), which are the first Spano code set, and outputs the read first code sequence A1 to the orthogonalized-code multiplying unit 241.

In the fifth transmission period to the eighth transmission period, in accordance with the control signal output by the transmission-signal control unit 211 and used for generating a pulse sequence, the pulse-sequence generating unit 221 reads, for example, the second code sequence B1 of the eight code sequences (A1, B1, B1', A1', B1, A1, A1', B1'), which are the first Spano code set, and outputs the read second code sequence B1 to the orthogonalized-code multiplying unit 241.

Thereafter, similarly, in the 29th transmission period to the 32nd transmission period, the pulse-sequence generating unit 221 reads, for example, the eighth code sequence B1' of the eight code sequences (A1, B1, B1', A1', B1, A1, A1', B1'), which are the first Spano code set, and outputs the read eighth code sequence B1' to the orthogonalized-code multiplying unit 241.

For each of the first transmission period to the fourth transmission period, the orthogonalized-code multiplying unit 241 sequentially multiplies, for example, the first code sequence A1 of the eight code sequences (A1, B1, B1', A1', B1, A1, A1', B1'), which are the first Spano code set, by one element of the orthogonalized code V1 (={1, 1, 1, 1}) read by the orthogonalized-code storage unit 231.

More specifically, in the first transmission period, the orthogonalized-code multiplying unit 241 multiplies the first code sequence A1 of the eight code sequences (A1, B1, B1', A1', B1, A1, A1', B1'), which are the first Spano code set, by {1}, which is the first element of the orthogonalized code V1 read by the orthogonalized-code storage unit 231.

In the fourth transmission period after the processing for the second and third transmission periods is finished, the orthogonalized-code multiplying unit 241 multiplies, for example, the first code sequence A1 of the eight code sequences (A1, B1, B1', A1', B1, A1, A1', B1'), which are the first Spano code set, by {1}, which is the fourth element of the orthogonalized code V1 read by the orthogonalized-code storage unit 231, in the same manner as described above.

Also, for each of the fifth transmission period to the eighth transmission period, the orthogonalized-code multiplying unit 241 sequentially multiplies the second code sequence B1 of the eight code sequences (A1, B1, B1', A1', B1, A1, A1', B1'), which are the first Spano code set, by one element of the orthogonalized code V1 (={1, 1, 1, 1}) read by the orthogonalized-code storage unit 231.

As described above, in the second multiplication method, for example, the sector radar SRD1 uses the eight code sequences (A1, B1, B1', A1', B1, A1, A1', B1'), which are the first Spano code set, to multiply the transmission code sequences by the orthogonalized code V1 in the first transmission period to the 32nd transmission period to generate transmission sequences:

"A1, A1, A1, A1,
B1, B1, B1, B1,
B1', B1', B1', B1',
A1', A1', A1', A1',
B1, B1, B1, B1,
A1, A1, A1, A1,
A1', A1', A1', A1',
B1', B1', B1', B1'"

In the first transmission period to the 32nd transmission period, the sector radar SRD2 uses the eight code sequences (A1, B1, B1', A1', B1, A1, A1', B1'), which are the first Spano code set, to multiply the transmission code sequences by the orthogonalized code V2 to thereby generate transmission sequences:

"A1, −A1, −A1, A1,
B1, −B1, −B1, B1,
B1', −B1', −B1', B1',
A1', −A1', −A1', A1',
B1, −B1, −B1, B1,
A1, −A1, −A1, A1,
A1', −A1', −A1', A1',
B1', −B1', −B1', B1'"

For example, because of an influence of a multi-cycle path, the local sector radar receives reflection wave signals from another sector radar with a delay up to the next transmission period. When the vector length of the orthogonalized codes V1 and V2 is 4, the local sector is influenced by interference of another sector radar, for the first code sequence during continuous use of the same code sequence four times. However, the influence is small because of the correlation value A1#B1, which is not correlated, and for the remaining three code sequences, interference signal components from another sector radar can be suppressed by multiplying the code sequences by the orthogonalized code.

Thus, by sequentially using the same code sequence a plurality of times in accordance with the vector length of the orthogonalized code V1 or V2, each sector radar SRD1 or SRD2 in the multi-sector radar 10 can suppress inter-range interference signal components, even when the local sector radar receives reflection wave signals from the other sector radar which are delayed to the next transmission period Tr.

In the first multiplication method in the present embodiment, the sector radars SRD1 and SRD2 in the multi-sector radar 10 multiply eight code sequences, which are a Spano code set, by one element of the corresponding orthogonalized codes V1 and V2.

Also, in the first multiplication method in the present embodiment, the sector radars SRD1 and SRD2 in the multi-sector radar 10 may multiply some of eight code sequences, which are a Spano code set, by one element of the corresponding orthogonalized codes V1 and V2 and multiply the remaining code sequences of the eight code sequences by one element of the corresponding orthogonalized codes V1 and V2.

For example, the eight code sequences (A, B, B', A', B, A, A', B'), which are a Spano code set, may be divided into the first four code sequences (A, B, B', A'), which are some of the eight code sequences, and the last four code sequences (B, A, A', B'), which are some of the eight code sequences, and the first four code sequences (A, B, B', A') and the last four code sequences (B, A, A', B') may be processed as Spano codes.

More specifically, the multi-sector radar 10 uses, for example, the orthogonalized code V2={1, −1, −1, 1} in the sector radar SRD2 to sequentially multiply the first four code sequences (A, B, B', A') and the last four code sequences (B, A, A', B') by each element of the orthogonalized code V2.

As a result, (A, B, B', A'), (−A, −B, −B', −A'), (−A, −B, −B', −A'), and (A, B, B', A') are obtained from the first four code sequences (A, B, B', A') as code sequences after the multiplication of the orthogonalized code V2.

Also, (B, A, A', B'), (−B, −A, −A', −B'), (−B, −A, −A', −B'), and (B, A, A', B') are obtained from the last four code sequences (B, A, A', B') as code sequences after the multiplication of the orthogonalized code V2.

Figure 15:
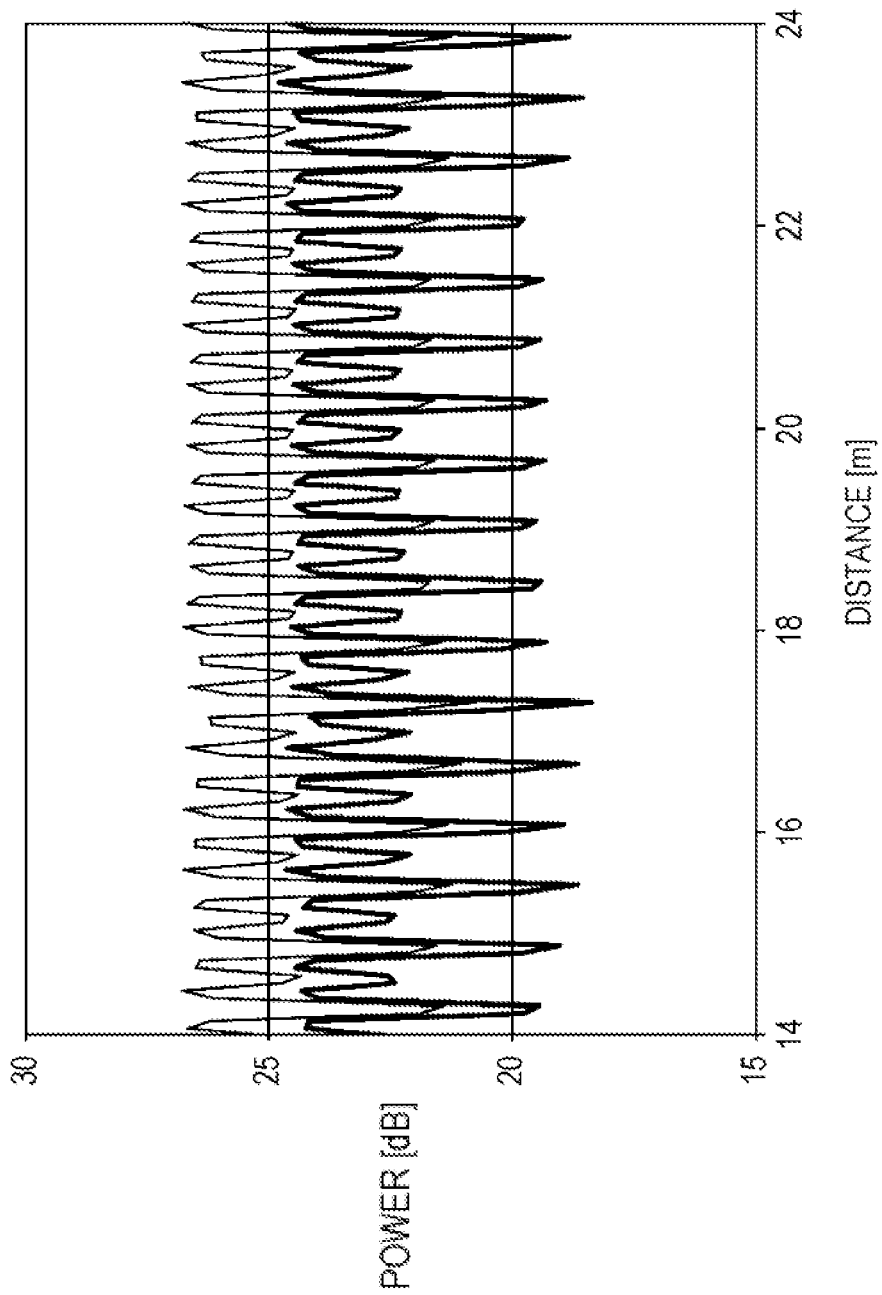
FIG. 15 illustrates a result of simulation of an interference suppression characteristic when the multi-sector radar in the second embodiment is used.

FIG. 15 illustrates a result of simulation of an interference suppression characteristic when the multi-sector radar 10 in the present embodiment is used. Conditions for the simulation are that a Spano code (having a code length 128) was used, the distance to a target was 20 m, the radar cross-section (RCS) of the target was +20 [dBsm], the phase speed of the target was 120 km/h, and the transmission period was 0.735 μsec. In addition, in the comparative example, the same orthogonalized codes as those in FIG. 4A were used as orthogonalized codes, the sector radar SRD1 used an orthogonalized code (+1, +1, +1, +1), and the sector radar SRD2 used an orthogonalized code (+1, −1, +1, −1). In the present embodiment, the same orthogonalized codes as those in FIG. 4B were used as the orthogonalized codes, the sector radar SRD1 used the orthogonalized code (+1, +1, +1, +1), and the sector radar SRD2 used an orthogonalized code (+1, −1, −1, +1).

Also, the simulation was executed on the condition that the desired to undesired signal ratio (DU ratio) for interference wave signals input to the sector radar SRD2 from the sector radar SRD1 was 0 [dB].

In FIG. 15, the horizontal axis indicates a distance [m] to a target, and the vertical axis indicates reception power [dB].

The reception power indicated by the vertical axis also represents sidelobes for the target placed at a distance of 20 [m]. Since the sector radar SRD1 and the sector radar SRD2 use transmission signals that are different from each other, no main lobe exists in the interference waves in FIG. 15.

The thin line represents a delay profile of interference waves when the sector radar SRD1 used the orthogonalized code (+1, +1, +1, +1) and the sector radar SRD2 used the orthogonalized code (+1, −1, +1, −1), as in the comparative example in FIG. 4A.

The thick line represents a delay profile of interference waves when the sector radar SRD1 used the orthogonalized code (+1, +1, +1, +1) and the sector radar SRD2 used the orthogonalized code (+1, −1, −1, +1), as in the present embodiment illustrated in FIG. 4B.

Through the use of the orthogonalized codes in the present embodiment, the sidelobes decreased from 26 dB to 24 dB, as opposed to the orthogonalized codes in the comparative example.

Third Embodiment

In the second embodiment described above, using eight code sequences, which are a Spano code set, as a unit, each sector radar SRD1 or SRD2 in the multi-sector radar 10 repeatedly multiplies the eight code sequences by the corresponding orthogonalized code V1 or V2, each having a vector length of 4, four times.

In a third embodiment, the sector radars SRD1 and SRD2 in the multi-sector radar 10 repeatedly use eight code sequences 2N (=N+N) times and further use the orthogonalized codes V1 and V2, each having a vector length of N, and an inter-range-interference-suppressing code OC (={1, −1, 1, −1, 1, −1, 1, −1}). The inter-range-interference-suppressing code OC is a code in which {+1} and {−1} are alternately repeated and is a vector having a length of 8.

In the present embodiment, there are two methods for multiplying the orthogonalized codes V1 and V2, the inter-range-interference-suppressing code OC, and eight code sequences, which are a Spano code set, as in the second embodiment. Details of each of the multiplication methods will be described below. Also, for ease of description below, the description will be given for N=4.

In the first multiplication method, in 8N transmission periods corresponding to the first N (=4) groups of transmission periods, each group being composed of eight transmission periods, the multi-sector radar 10 multiplies a set of eight code sequences by one element of each of the orthogonalized codes V1 and V2, each having a vector length of N, by using eight code sequences, which are a Spano code set, as a unit. In addition, in 8N transmission periods corresponding to last N (=4) groups of transmission periods, each group being composed of eight transmission periods (8Tr), the multi-sector radar 10 multiplies a set of eight code sequences by one element of each of the orthogonalized codes V1 and V2, each having a vector length of N (=4), and further multiplies the resulting code sequences by the inter-range-interference-suppressing code OC (see FIG. 9).

Figure 10:
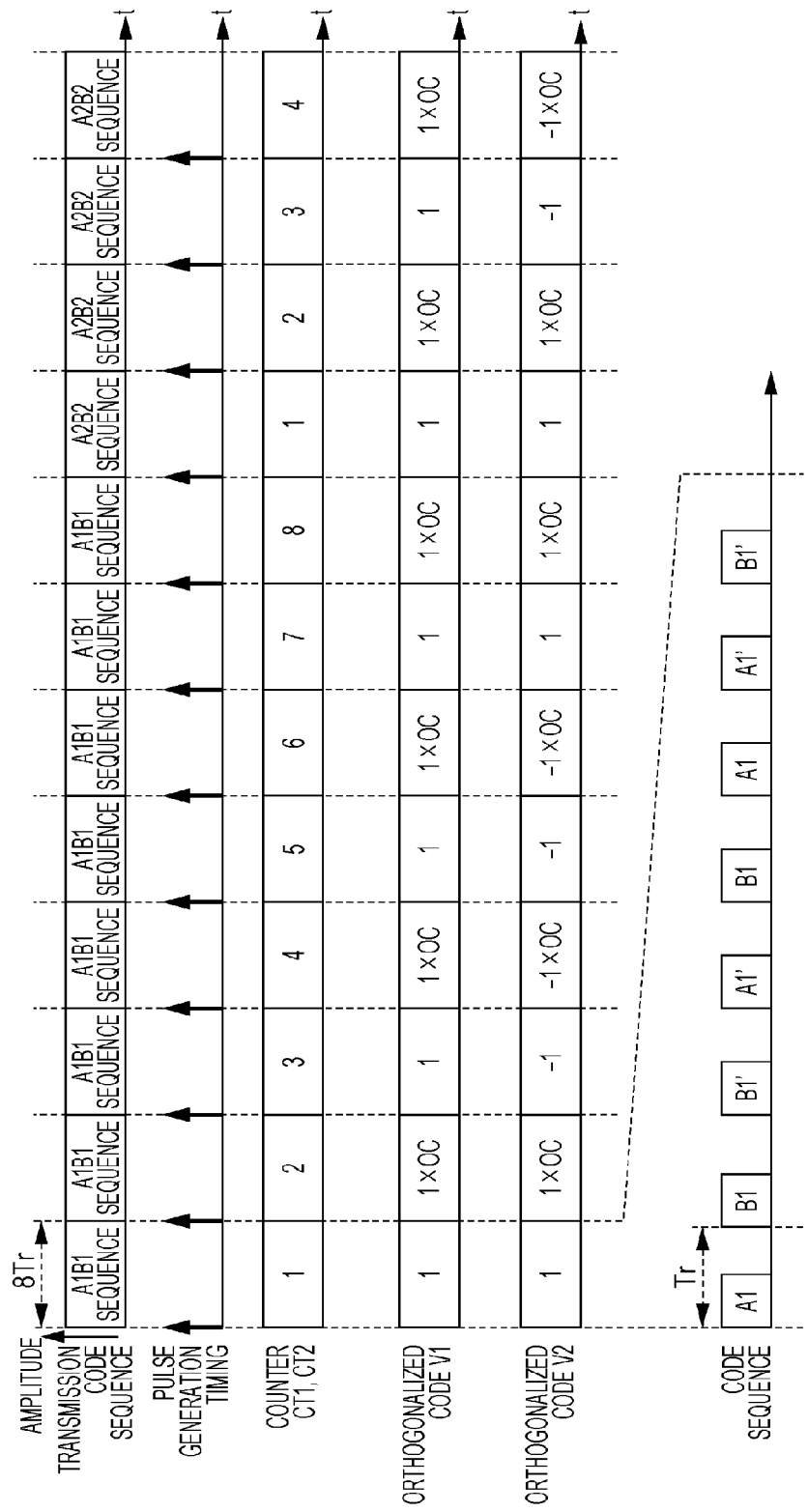
FIG. 10 is a time chart illustrating a second example of the relationships of the transmission code sequences, the pulse generation timing, the counters, the orthogonalized codes, and the inter-range-interference-suppressing code in the sector radars in the multi-sector radar in the third embodiment.

In the second multiplication method, using eight code sequences, which are a Spano code set, as a unit, the multi-sector radar 10 multiplies, in the odd-numbered (the first, third, fifth, and seventh) eight transmission periods (8Tr), a set of eight code sequences by one element of each of the orthogonalized codes V1 and V2, each having a vector length of N (=4), and in the even-numbered (the second, fourth, sixth, and eighth) eight transmission periods (8Tr), the multi-sector radar 10 multiplies a set of eight code sequences by one element of each of the orthogonalized codes V1 and V2, each having a vector length of N (=4), and further multiplies the resulting code sequences by the inter-range-interference-suppressing code OC (see FIG. 10).

(First Multiplication Method for Spano Codes, Orthogonalized Codes V1 and V2, and Inter-Range-Interference-Suppressing Code OC)

Figure 9:
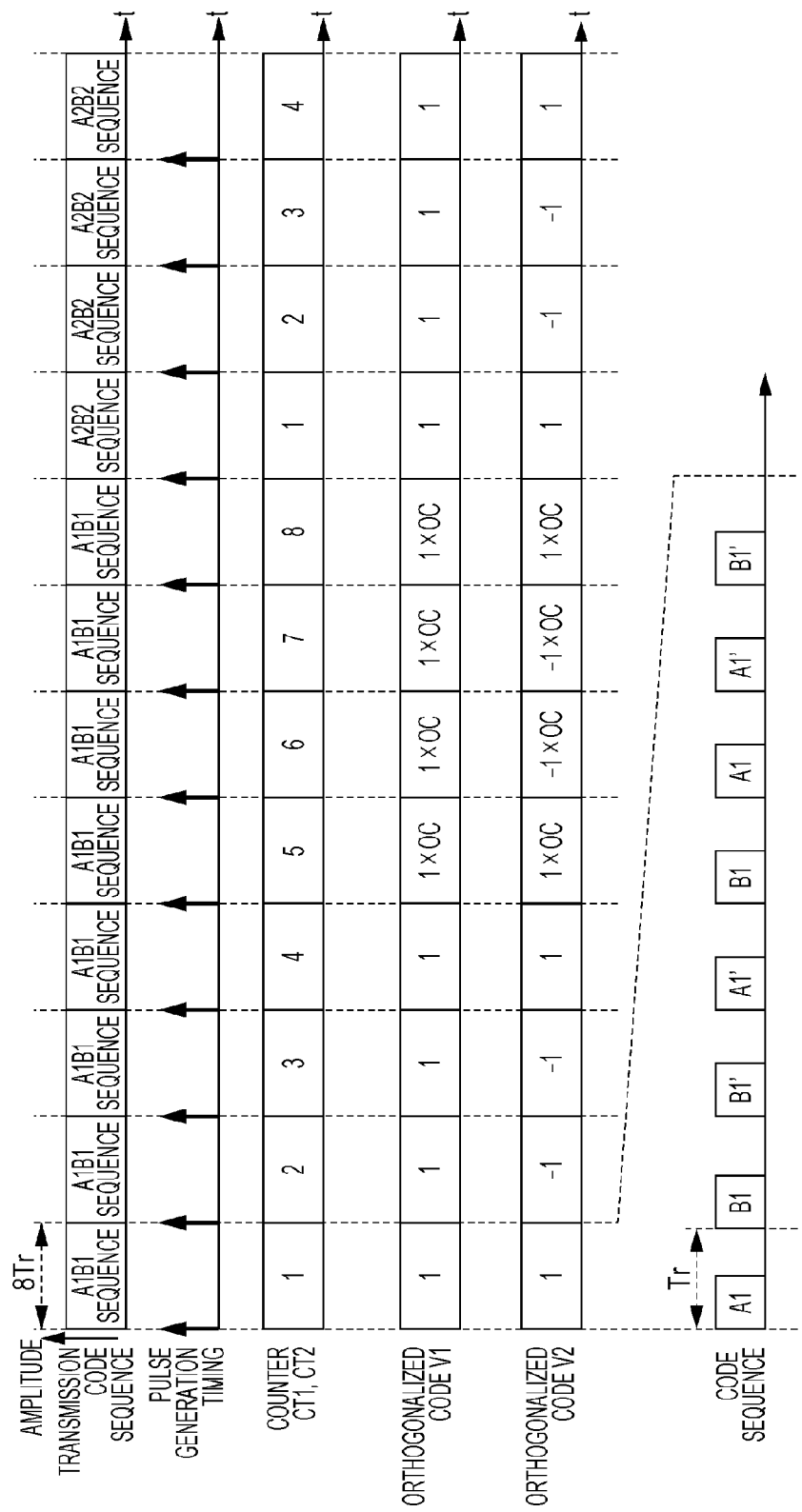
FIG. 9 is a time chart illustrating a first example of relationships of transmission code sequences, pulse generation timing, the counters, orthogonalized codes, and an inter-range-interference-suppressing code in the sector radars in the multi-sector radar in a third embodiment.

First, the first multiplication method for the Spano codes, the orthogonalized codes V1 and V2, and the inter-range-interference-suppressing code OC will be described with reference to FIG. 9. FIG. 9 is a time chart illustrating a first example of relationships of transmission code sequences, pulse generation timing, the counters CT1 and CT2, orthogonalized codes V1 and V2, and an inter-range-interference-suppressing code in the sector radars SRD1 and SRD2 in the multi-sector radar 10 in the third embodiment. Although the operation of the sector radar SRD1 is described for ease of description in FIG. 9, the sector radar SRD2 also operates in a similar manner. In the description in FIG. 9, the same details as those of the description in FIG. 7 are not described or are briefly described, and different details will be described.

In 64 transmission periods corresponding to eight groups of transmission periods, each group being composed of eight transmission periods (8Tr) illustrated in FIG. 9, the transmission-signal control unit 211 outputs A1B1-sequence Spano codes (A1, B1, B1', A1', B1, A1, A1', B1') to the pulse-sequence generating unit 221 for each transmission period (Tr) in accordance with a control signal used for generating a pulse sequence. In 32 transmission periods (4×8 transmission periods) corresponding to the first four groups of transmission periods, each group being composed of eight transmission periods (8Tr), the transmission-signal control unit 211 outputs, to the orthogonalized-code storage unit 231, a control signal used for reading the orthogonalized code V1 stored by the orthogonalized-code storage unit 231, and in 32 transmission periods (4×8 transmission periods) corresponding to the last four groups of transmission periods, each group being composed of eight transmission periods, the transmission-signal control unit 211 outputs, to the orthogonalized-code storage unit 231, a control signal used for reading the orthogonalized code V1 and the inter-range-interference-suppressing code OC stored by the orthogonalized-code storage unit 231 (see FIG. 9). In the present embodiment, the orthogonalized codes V1 and V2 are vectors {1, 1, 1, 1} and {1, −1, −1, 1}, each having a length of 4, as in the first embodiment.

For every eight transmission periods, each time the transmission-signal control unit 211 outputs a control signal for generating a Spano code to the pulse-sequence generating unit 221, the transmission-signal control unit 211 increments the value of the counter CT1. For example, when the vector length of the inter-range-interference-suppressing code OC is 8, the value of the counter CT1 repeats 1, 2, 3, 4, 5, 6, 7, and 8 in this order for every eight transmission periods in accordance with the vector length of the inter-range-interference-suppressing code OC.

In the fifth (counter CT1=5) eight transmission periods (8Tr), the orthogonalized-code multiplying unit 241 multiplies, for example, the eight code sequences (A1, B1, B1′, A1′, B1, A1, A1′, B1′), which are a first Spano code set, by the first element {+1} of the orthogonalized code V1 and the inter-range-interference-suppressing code OC.

In the eighth (counter CT1=8) eight transmission periods (8Tr) after processing for the counter CT=6 and the counter CT=7 is finished, the orthogonalized-code multiplying unit 241 similarly multiplies, for example, the eight code sequences (A1, B1, B1′, A1′, B1, A1, A1′, B1′), which are the first Spano code set, by the fourth element {+1} of the orthogonalized code V1 and the inter-range-interference-suppressing code OC.

Also, in the next eight transmission periods (8Tr) after the eighth (counter CT1=8) eight transmission periods (8Tr), the orthogonalized-code multiplying unit 241 multiplies, for example, the eight code sequences (A2, B2, B2′, A2′, B2, A2, A2′, B2′), which are a second Spano code set, by the first element {+1} of the orthogonalized code V1.

Thereafter, similarly, in 32 transmission periods corresponding to the first four groups of transmission periods, each group being composed of eight transmission periods, the orthogonalized-code multiplying unit 241 repeats the multiplication of the eight code sequences, which are a Spano code set, by any element of the orthogonalized code V1, and in 32 transmission periods corresponding to the last four groups of transmission periods, each group being composed of eight transmission periods, the orthogonalized-code multiplying unit 241 repeats the multiplication of the eight code sequences, which are a Spano code set, by any element of the orthogonalized code V1 and the inter-range-interference-suppressing code OC. Since the operations of the transmission-signal control unit 212, the pulse-sequence generating unit 222, and the orthogonalized-code multiplying unit 242 in the sector radar SRD2 are also analogous to those of the transmission-signal control unit 211, the pulse-sequence generating unit 221, and the orthogonalized-code multiplying unit 241 in the sector radar SRD1, descriptions thereof are not given hereinafter.

That is, in the first multiplication method, the multi-sector radar 10 cancels other sector interference by using a set of CT=1, 2, 3, and 4 or a set of CT=5, 6, 7, and 8 and cancels the inter-range interference by using pairs of CT=(1, 5), (2, 6), (3, 7), and (4, 8).

For example, the multi-sector radar 10 cancels interference from another sector for a first pulse for CT=1 by using a first pulse for CT=2, 3, and 4 and cancels the inter-range interference between the first pulse and a second pulse for CT=1 by using a first pulse and a second pulse for CT=5.

Accordingly, in the first multiplication method, since the temporal positions of the paired counters CT for the cancellation of interference from another sector are closer to each other than those for the cancellation of the inter-range interference, the effect of suppressing interference signal components from another sector radar is higher than the effect of suppressing inter-range interference signals in the local sector radar.

As described above, in the first multiplication method, in 8N transmission periods corresponding to the first N (=4) groups of transmission periods, each group being composed of eight transmission periods, the multi-sector radar 10 multiplies a set of eight code sequences by one element of the corresponding orthogonalized codes V1 and V2, each having a vector length of N, and in 8N transmission periods corresponding to the last N (=4) groups of transmission periods, each group being composed of eight transmission periods, the multi-sector radar 10 multiplies a set of eight code sequences by one element of the corresponding orthogonalized codes V1 and V2, each having a vector length of N (=4), and further multiplies the resulting code sequences by the inter-range-interference-suppressing code OC.

For example, under an environment (e.g., a moving target) in which the Doppler frequency changes, the phase of the correlation value between the transmission sequence (transmission signals) and the reception signals rotates for each transmission period. Hence, according to the first multiplication method, the multi-sector radar 10 is effective in suppressing interference signal components from another sector radar in 8N transmission periods corresponding to the first N (=4) groups of transmission periods, each group being composed of eight transmission periods. Since the multi-sector radar 10 multiplies a set of eight code sequences by one element of the corresponding orthogonalized codes V1 and V2, each having a vector length of N, it is possible to provide the effect of suppressing inter-range interference signals in the local sector radar.

(Second Multiplication Method for Spano Codes, Inter-Range-Interference-Suppressing Code OC, and Orthogonalized Codes V1 and V2)

Next, the second multiplication method for the Spano codes, the orthogonalized codes V1 and V2, the inter-range-interference-suppressing code OC will be described with reference to FIG. 10. FIG. 10 is a time chart illustrating a second example of the relationships of transmission code sequences, pulse generation timing, the counters CT1 and CT2, the orthogonalized codes V1 and V2, and the inter-range-interference-suppressing code in the sector radars SRD1 and SRD2 in the multi-sector radar 10 in the third embodiment. Although the operation of the sector radar SRD1 is described for ease of description in FIG. 10, the sector radar SRD2 also operates in a similar manner, and the same details as those of the first multiplication method are not described or are briefly described, and different details will be described.

The transmission-signal control unit 211 outputs, to the pulse-sequence generating unit 221, a control signal for generating A1B1-sequence Spano codes (A1, B1, B1′, A1′, B1, A1, A1′, B1′) in 64 transmission periods corresponding to eight groups of transmission periods, each group being composed of eight transmission periods, illustrated in FIG. 10.

In each of the odd-numbered (the first, third, fifth, and seventh) eight transmission periods illustrated in FIG. 10, the transmission-signal control unit 211 outputs, to the orthogonalized-code storage unit 231, a control signal used for reading the orthogonalized code V1 stored by the orthogonalized-code storage unit 231.

In each of the even-numbered (the second, fourth, sixth, and eighth) eight transmission periods illustrated in FIG. 10, the transmission-signal control unit 211 outputs, to the orthogonalized-code storage unit 231, a control signal used for reading the orthogonalized code V1 and the inter-range-interference-suppressing code OC stored by the orthogonalized-code storage unit 231 (see FIG. 10). In the present embodiment, the orthogonalized codes V1 and V2 are also vectors {1, 1, 1, 1} and {1, −1, −1, 1}, each having a length of 4, as in the first embodiment.

Each time the transmission-signal control unit 211 outputs the control signal used for generating Spano codes for every eight transmission periods to the pulse-sequence generating unit 221, the transmission-signal control unit 211 increments the value of the counter CT1. For example, when the vector length of the inter-range-interference-suppressing code OC is 8, the value of the counter CT1 repeats 1, 2, 3, 4, 5, 6, 7, and 8 in this order for every eight transmission periods in accordance with the vector length of the inter-range-interference-suppressing code OC.

In the first (counter CT=1) eight transmission periods (8Tr), the orthogonalized-code multiplying unit 241 multiplies, for example, the eight code sequences (A1, B1, B1', A1', B1, A1, A1', B1'), which are a first Spano code set, by the first element {+1} of the orthogonalized code V1.

In the second (counter CT=2) eight transmission periods (8Tr), the orthogonalized-code multiplying unit 241 multiplies, for example, the eight code sequences (A1, B1, B1', A1', B1, A1, A1', B1'), which are the first Spano code set, by the first element {+1} of the orthogonalized code V1 and the inter-range-interference-suppressing code OC.

Also, in the next eight transmission periods (8Tr) after the eighth (counter CT1=8) eight transmission periods (8Tr), the orthogonalized-code multiplying unit 241 multiplies, for example, the eight code sequences (A2, B2, B2', A2', B2, A2, A2', B2'), which are a second Spano code set, by the first element {+1} of the orthogonalized code V1.

Thereafter, similarly, in the first (counter CT=1) to the eighth (counter CT=8) eight transmission periods, the orthogonalized-code multiplying unit 241 repeats the multiplication of the Spano codes and an element of the orthogonalized code V1 in the odd-numbered eight transmission periods (8Tr) and the multiplication of the Spano codes, an element of the orthogonalized code V1, and the range-interference-suppressing code OC in the even-numbered eight transmission periods (8Tr). Since the operations of the transmission-signal control unit 212, the pulse-sequence generating unit 222, and the orthogonalized-code multiplying unit 242 in the sector radar SRD2 are analogous to those of the transmission-signal control unit 211, the pulse-sequence generating unit 221, and the orthogonalized-code multiplying unit 241 in the sector radar SRD1, descriptions thereof are not given hereinafter.

Now, the multi-sector radar 10 being capable of suppressing inter-range interference in the local sector radar (e.g., the sector radar SRD1) by multiplication of the inter-range-interference-suppressing code OC will be described with reference to FIG. 10.

In the seventh (counter CT=7) eight transmission periods (8Tr) illustrated in FIG. 10, the transmission code sequences multiplied by the orthogonalized-code multiplying unit 241 are A1, B1, B1', A1', B1, A1, A1', and B1'.

Also, in the eighth (counter CT=8) eight transmission periods (8Tr), the transmission code sequences multiplied by the orthogonalized-code multiplying unit 241 are A1, −B1, B1', −A1', B1, −A1, A1', and −B1'.

Also, in the first (counter CT=1) eight transmission periods (8Tr) for the next transmission A2B2 code sequences, the transmission code sequences multiplied by the orthogonalized-code multiplying unit 241 are A2, B2, B2', A2', B2, A2, A2', and B2'.

Figure 14:
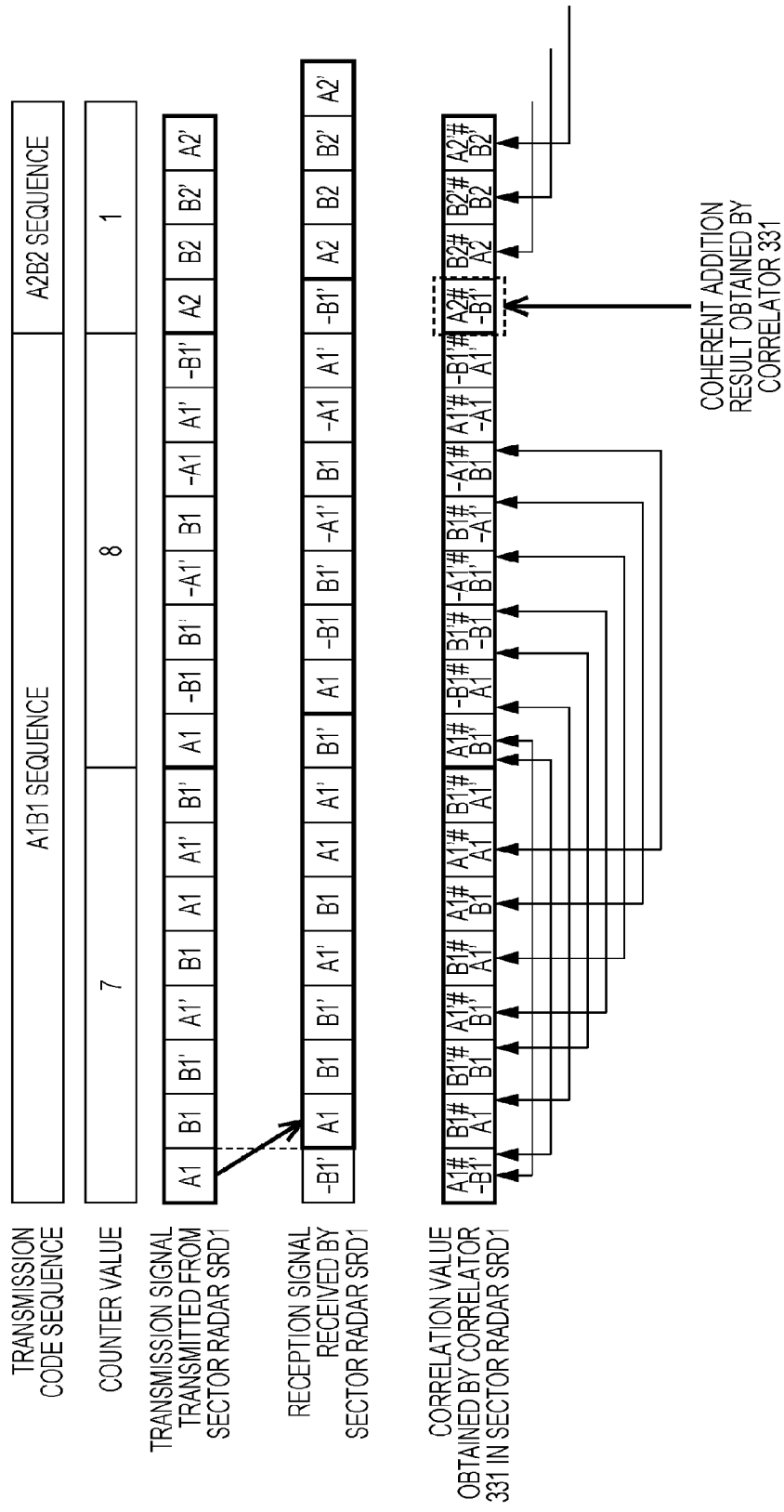
FIG. 14 is a diagram illustrating correlation values obtained by the correlator in the sector radar in a state in which a reception delay corresponding to one transmission period has occurred.

FIG. 14 illustrates a state in which, for example, because of a moving target, a transmission code sequence in the seventh (counter CT=7) eight transmission periods (8Tr) of the sector radar SRD1 is received with a delay up to the first transmission period of the eighth (counter CT=8) eight transmission periods (8Tr). That is, this is a state in which a reception delay corresponding to one transmission period has occurred. FIG. 14 is a diagram illustrating correlation values obtained by the correlator 331 in the sector radar SRD1 in a state in which a reception delay corresponding to one transmission period has occurred.

In order to perform correlation computation on the reception signals and the transmission signals in each transmission period, the correlator 331 in the sector radar SRD1 computes a transmission code sequence shifted by one transmission period in FIG. 14. However, since the transmission code sequences in the eighth (counter CT=8) eight transmission periods (8Tr) are multiplied by the inter-range-interference-suppressing code OC, the correlation values for the transmission code sequences in the seventh (counter CT=7) eight transmission periods (8Tr) are canceled out by the correlation values for the transmission code sequences in the eighth (counter CT=8) eight transmission periods (8Tr).

However, since the correlation value for −B1' in the eighth (counter CT=8) eighth transmission periods in which the transmission code sequence changes is not cancelled out, A2#−B1' is output as a coherent addition result. Since the correlation value A2#−B1', which is a coherent addition result obtained by the correlator 331 in the sector radar SRD1, is not correlated, the influence is small.

In the sector radar SDR2, the polarity of the orthogonalized code V2 changes to a negative polarity for the counter CT=3, 4, 5, and 6. Thus, even for the same transmission A1B1 code sequence, a correlation value −A#−B1' for the code −B1' in the eighth transmission period for the counter CT=2 and the code −A in the eighth transmission period for the counter CT=3 is a coherent addition result obtained by the correlator 332 in the sector radar SRD2. However, since this correlation value is not correlated, the influence is small.

That is, with the combinations of the transmission code sequences and the orthogonalized codes in FIG. 10, correlation values whose coherent addition results do not become zero are computed at the boundary of the counters CT=2 and 3, the boundary of the counters CT=6 and 7, and further the boundary of the counters CT=1 and 8. However, since these correlation values are not correlated values, the influence is small.

Making the coherent addition results of the correlation values to be zero, that is, performing multiplication of the inter-range-interference-suppressing code OC over 8×P (=L/4) transmission periods, makes it possible to suppress interference signal components for the transmission code sequence in the first or last transmission period in the eight transmission periods. However, under an environment in which the Doppler frequency changes, the multiplication of the inter-range-interference-suppressing code OC over 8×P transmission periods can involve deterioration of the correlation characteristic during 8×P transmission periods.

Thus, rather than performing multiplication of the inter-range-interference-suppressing code OC over 8×P transmission periods, the multi-sector radar 10 that uses the second multiplication method performs multiplication of the inter-range-interference-suppressing code OC over the eight transmission periods, making it difficult to suppress interference signal components for the transmission code sequence in the first or last transmission period of the eight transmission periods. However, the multiplication performed by the multi-sector radar 10 makes it possible to suppress interference signal components for the transmission code sequences in the remaining seven transmission periods.

As described above, in the second multiplication method, in the odd-numbered (the first, third, fifth, and seventh) eight transmission periods, the multi-sector radar 10 multiplies a set of eight code sequences, which are Spano codes, by one element of the corresponding orthogonalized codes V1 and V2, each having a vector length of N (=4), and in the even-numbered (the second, fourth, sixth, and eighth) eight transmission periods, the multi-sector radar 10 multiplies a set of eight code sequences, which are Spano codes, by one element of the corresponding orthogonalized codes V1 and V2, each having a vector length of N (=4), and further multiplies the resulting code sequences by the inter-range-interference-suppressing code OC.

In the second multiplication method, the code(s) by which the eight code sequences, which are Spano codes, are multiplied is alternately switched between the orthogonalized code V1 or V2 and both of the orthogonalized code V1 or V2 and the inter-range-interference-suppressing code OC in the odd-numbered eight transmission periods and the even-numbered eight transmission periods. Thus, in the second multiplication method, the multi-sector radar 10 can provide the effect of suppressing interference signal components from another sector radar, and can further provide a greater effect of suppressing inter-range interference signals in the local sector radar than the effect of suppressing interference signal components from another sector radar.

Fourth Embodiment

In the first to third embodiments, one-dimensional $\{+1\}$ and $\{-1\}$ on the I-axis of the IQ constellation have been used for the orthogonalized codes V1 and V2. In a fourth embodiment, an example using two-dimensional elements on the I-axis and the Q-axis of the IQ constellation will be described as a variation of the orthogonalized codes V1 and V2.

In this case, for ease of description, VV=$\{1, -1, -1, 1\}$ is used as the fundamental vector VV in the first embodiment. The vector $\{1, -1\}$ of the first half of the fundamental vector VV can be interpreted as being $\{\exp(j\cdot 0°), \exp(j\cdot 180°)\}$. That is, in the first embodiment described above, in the IQ constellation, a vector that satisfies an angle that goes around 360° by two steps is used as the orthogonalized codes V1 and V2.

In the fourth embodiment, in the IQ constellation, a vector resulting from coupling of a vector that satisfies an angle that goes around 360° by arbitrary M steps and a reversely arranged vector of the vector that satisfies the angle that goes 360° by the arbitrary M steps is used as the fundamental vector VV.

For example, for M=2, 3, and 4, $$M = 2: \{\exp(j\cdot 0°), \exp(j\cdot 180°)\}$$
$$= \{1, -1\},$$
$$M = 3: \{\exp(j\cdot 0°), \exp(j\cdot 120°), \exp(j\cdot 240°)\},$$
$$= \{1, (-1/2 + j\cdot \sqrt{3}/2), (-1/2 - j\cdot \sqrt{3}/2)\}, \text{ and}$$
$$M = 4: \{\exp(j\cdot 0°), \exp(j\cdot 90°), \exp(j\cdot 180°), \exp(j\cdot 270°)\}$$
$$= \{1, j, -1, -j\}.$$

Thus, for example, for M=4, the fundamental vector VV in the present embodiment is $\{1, j, -1, -j, -j, -1, j, 1\}$. With the fundamental vector VV $\{1, j, -1, -j, -j, -1, j, 1\}$, the orthogonalized code V1 used by the sector radar SRD1 and the orthogonalized code V2 used by the sector radar SRD2 are given as, for example, V1=$\{1, j, 1, j, j, 1, j, 1\}$ and V2=$\{1, 1, -1, -1, -1, -1, 1, 1\}$ that satisfy equation (3) (see FIG. 11).

Figure 11:
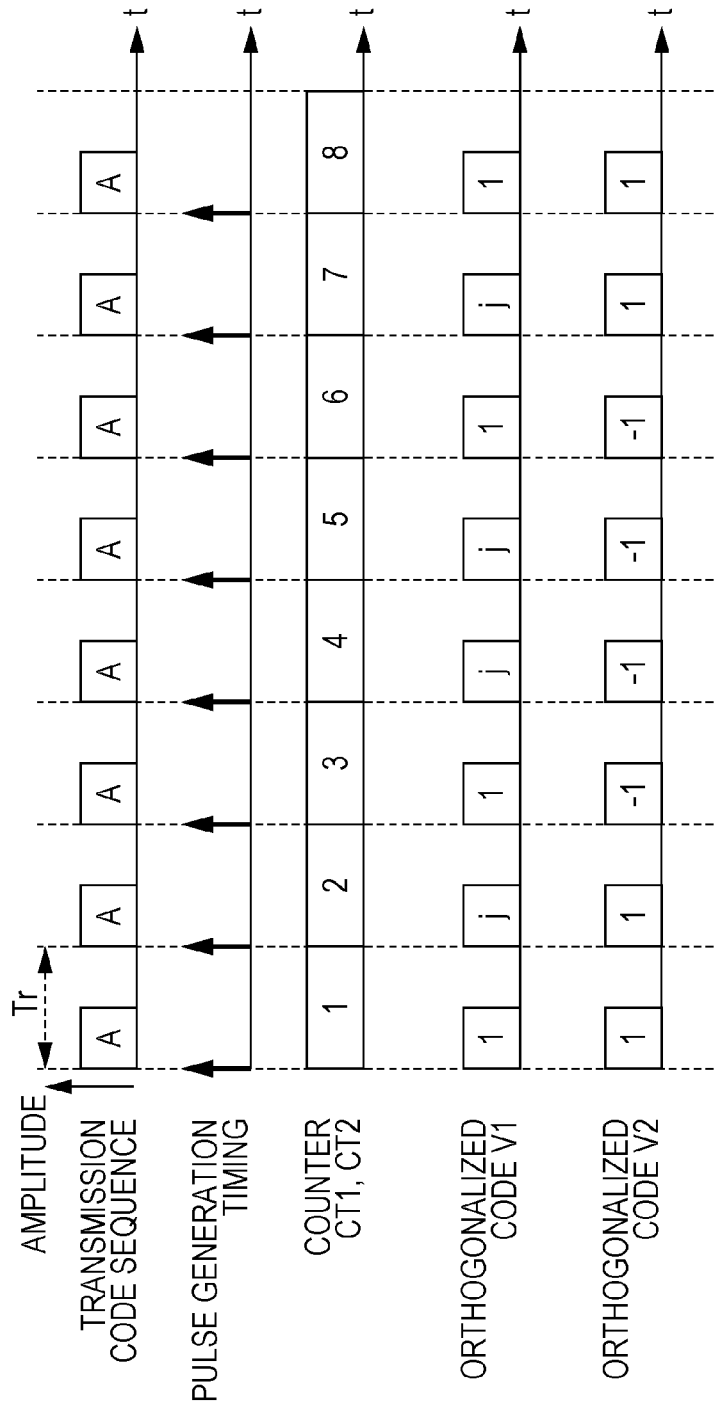
FIG. 11 is a time chart illustrating relationships of code sequences, pulse generation timing, the counters, and orthogonalized codes in the sector radars in the multi-sector radar in a fourth embodiment.

FIG. 11 is a time chart illustrating relationships of code sequences, pulse generation timing, the counters CT1 and CT2, and the orthogonalized codes V1 and V2 in the sector radars SRD1 and SRD2 in the multi-sector radar 10 in the fourth embodiment.

A vector $\{1, j, -1, -j, -j, -1, j, 1, 1, j, -1, -j, -j, -1, j, 1\}$ obtained by coupling the fundamental vector VV $\{1, j, -1, -j, -j, -1, j, 1\}$ and a vector $\{1, j, -1, -j, -j, -1, j, 1\}$, obtained by arranging the fundamental vector VV $\{1, j, -1, -j, -j, -1, j, 1\}$ in reverse order, may also be used as the fundamental vector VV in the present embodiment.

That is, for an integer M that is greater than or equal to 2, a vector having a length of $M \times 2^U$ (U is an integer greater than or equal to 2), the vector resulting from repeated coupling of a vector that satisfies an angle that goes around 360° by arbitrary M steps and a reversely arranged vector of the vector that satisfies the angle that goes around 360° by the arbitrary M steps, may also be used as the fundamental vector in the present embodiment.

Figure 12:
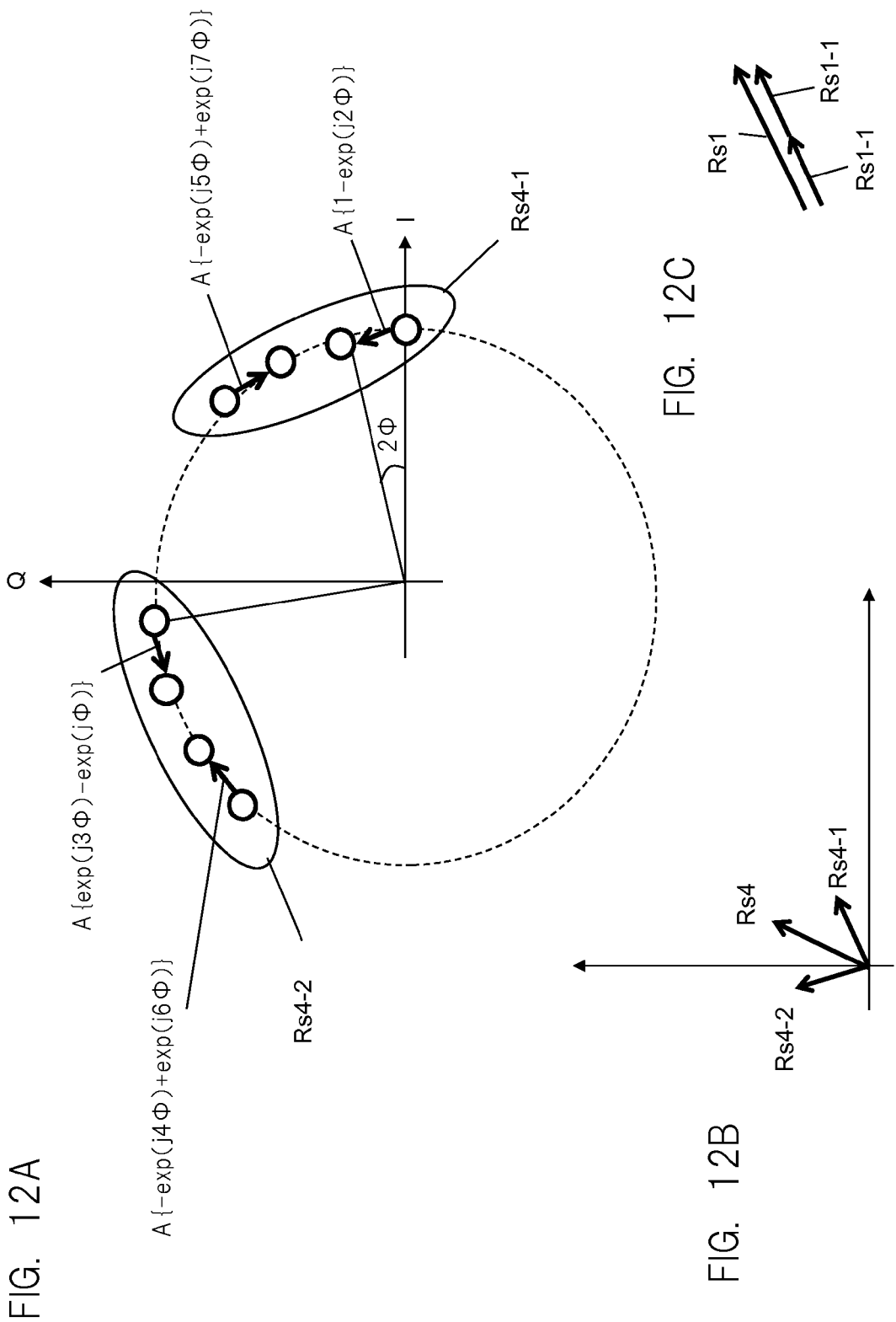
FIG. 12A is a diagram illustrating interference signal components of the multi-sector radar in the fourth embodiment.
FIG. 12B illustrates a vector sum of the interference signal components illustrated in FIG. 12A.
FIG. 12C illustrates a vector sum of interference signal components in the multi-sector radar in the first embodiment, the interference signal components being obtained in a number of transmission periods which is the same as the number of those in the multi-sector radar in the fourth embodiment.

FIG. 12A is a diagram illustrating interference signal components of the multi-sector radar 10 in the fourth embodiment. FIG. 12B illustrates a vector sum of the interference signal components illustrated in FIG. 12A. FIG. 12C illustrates a vector sum of interference signal components in the multi-sector radar 10 in the first embodiment, the interference signal components being obtained in a number of transmission periods which is the same as the number of those in the multi-sector radar 10 in the fourth embodiment.

In FIG. 12A, for example, interference signal components computed by the sector radar SRD1 through use of the orthogonalized codes V1 and V2 illustrated in FIG. 11 are depicted on the circumference of an IQ constellation. The fundamental vector VV $\{1, j, -1, -j, -j, -1, j, 1\}$ includes elements of real numbers and imaginary numbers. For the elements of the first, third, sixth, and eighth real numbers when $\phi$ is small, a vector A $\{1-\exp(j2\phi)\}$ and a vector A $\{-\exp(j5\phi)+\exp(j7\phi)\}$ point in opposite directions and can be approximated as being equal to each other in magnitude as an interference signal component Rs4-1. Similarly, in the elements of the second, fourth, fifth, and seventh imaginary numbers, a vector A $\{-\exp(j4\phi)+\exp(j6\phi)\}$ and a vector A $\{\exp(j3\phi)-\exp(j\phi)\}$ point in opposite directions and can be approximated as being equal to each other in magnitude as an interference signal component Rs4-2. The "vectors pointing in opposite directions and being equal to each other in magnitude" are vectors that can obtain the effects in the present embodiment, as long as a difference is within a predetermined range.

FIG. 12B illustrates the interference signal component Rs4-1 corresponding to a sum of the concentrically arranged vector A $\{1-\exp(j2\phi)\}$ and vector A $\{-\exp(j5\phi)+\exp(j7\phi)\}$ and the interference signal component Rs4-2 corresponding to a sum of the concentrically arranged vector A $\{-\exp(j4\phi)+\exp(j6\phi)\}$ and vector A $\{\exp(j3\phi)-\exp(j\phi)\}$, and an interference signal component Rs4 corresponding to a sum of the interference signal component Rs4-1 and the interference signal component Rs4-2. Since these vectors are concentrically arranged, the interference signal components Rs4-1, Rs4-2, and Rs4 can be calculated.

FIG. 12C illustrates interference signal components in eight transmission periods, the interference signal components resulting from multiplication of all of the elements of the orthogonalized codes in the fourth embodiment for which the orthogonalized codes V1 and V2 in the first embodiment illustrated in FIG. 3 are used. In the first embodiment, since all of the elements of the orthogonalized code are multiplied in four transmission periods, an interference signal component Rs1 in eight transmission periods has twice the magnitude of an interference signal component Rs1-1 in the four transmission periods. The interference signal component Rs1-1 in the four transmission periods in the first embodiment and the interference signal component Rs4-1 in the eight transmission periods in the fourth embodiment have the same magnitude. The "same magnitude" is a magnitude that can obtain the effects in the present embodiment, as long as a difference is within a predetermined range.

Thus, since the interference signal component Rs4-1 and the interference signal component Rs4-2 are orthogonal to each other, the interference signal component Rs4 in the eight transmission periods in the fourth embodiment is √2 times of the interference signal component Rs4-1 or the interference signal component Rs4-2. Thus, it can be understood that the interference signal component Rs4 in the eight transmission periods in the fourth embodiment is smaller than the interference signal component Rs1 in the four transmission periods in the first embodiment.

As described above, by using the orthogonalized codes V1 and V2 that satisfy equation (3) on the basis of the fundamental vector VV using two-dimensional elements on the I-axis and the Q-axis of the IQ constellation, the multi-sector radar 10 in the present embodiment can suppress more interference signal components from another sector radar than that in the first embodiment. That is, it is possible to increase the suppression effect by increasing the number of steps, N.

Fifth Embodiment

In the first to fourth embodiments described above, the transmission code sequences used by the sector radars SRD1 and SRD2 are the same. In a fifth embodiment, an example in which some or all of the transmission code sequences used by the sector radars SRD1 and SRD2 are different will be described in connection with, for example, the multi-sector radar 10 in the second embodiment. In the description below, code sequences used by the sector radar SRD1 are indicated by Xn, and code sequences used by the sector radar SRD2 are indicated by Yn.

Figure 13:
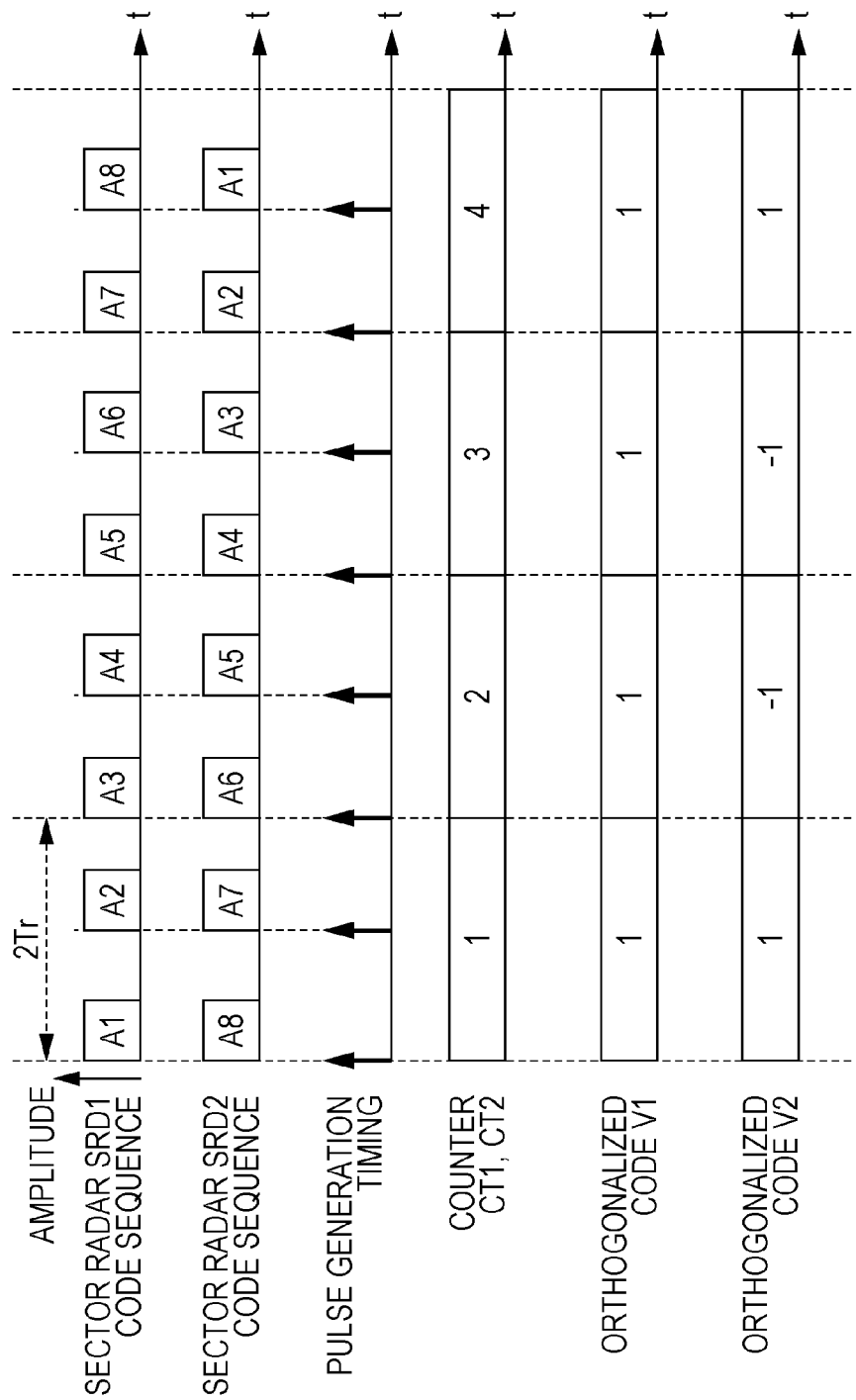
FIG. 13 is a time chart illustrating relationships of code sequences, pulse generation timing, the counters, and orthogonalized codes in the sector radars in the multi-sector radar in a fifth embodiment.

FIG. 13 is a time chart illustrating relationships of code sequences, pulse generation timing, the counters CT1 and CT2, and orthogonalized codes V1 and V2 in the sector radars SRD1 and SRD2 in the multi-sector radar 10 in the fifth embodiment. The code sequences Xn used by the sector radar SRD1 are {A1, A2, A3, A4, A5, A6, A7, A8}, and the code sequences Yn used by the sector radar SRD2 are, for example, {A8, A7, A6, A5, A4, A3, A2, A1}, which are obtained by arranging {A1, A2, A3, A4, A5, A6, A7, A8} in reverse order. The code sequences {A1, A2, A3, A4, A5, A6, A7, A8} are, for example, Spano codes. The code sequences Xn used by the sector radar SRD1 and the code sequences Yn used by the sector radar SRD2 may also be the same.

Also, when the code sequences Xn used by the sector radar SRD1 and the code sequences Yn used by the sector radar SRD2 are uncorrelated, the multi-sector radar 10 can deal with even a case in which two uncorrelated code sequences Xn and Yn do not exist, although the effect of suppressing interference signal components from another sector radar is large. Accordingly, the multi-sector radar 10 in the present embodiment uses the code sequences Xn and the code sequences Yn which do not have the same code in the same transmission period, that is, uses code sequences in which the code sequences Yn are arranged in the reverse order of the code sequences Xn.

With this arrangement, in the multi-sector radar 10 in the present embodiment, the pulse-sequence generating units 221 and 222 in the sector radars SRD1 and SRD2 can use the same ROM as a memory for storing the code sequences. Thus, with a simple configuration, it is possible to suppress interference signal components from another sector radar.

The code sequences Yn may be code sequences {Xk, X(k−1), X(k−2), . . . , X1, Xn, X(n−1), . . . , X(k+1)} in which the code sequences are arranged in reverse order from the kth code sequence of the code sequences Xn and may be code sequences {Xk, X(k+1), X(k+2), . . . , Xn, X1, X2, . . . , X(k−1)} in which the code sequences are arranged in regular order from the kth code sequence of the code sequences Xn.

Although various embodiments have been described above with reference to the accompanying drawings, it goes without saying that the present disclosure is not limited to such examples. It is apparent to those skilled in the art that various changes and modifications can be conceived within the scope recited in the claims, and such changes and modifications also naturally belong to the technical scope of the present disclosure.

The present disclosure is useful for a multi-sector radar that suppresses deterioration of a correlation characteristic of reception signals and that suppresses interference between sector radars by transmitting transmission signals multiplied by predetermined orthogonalized codes, even when phase rotation occurs in reception signals with changes in the Doppler frequency.

What is claimed is:

1. A multi-sector radar comprising:
a first sector radar including a first transmission-sequence generating unit that generates a first transmission sequence and a first transmitting unit that transmits the first transmission sequence; and
a second sector radar including a second transmission-sequence generating unit that generates a second transmission sequence and a second transmitting unit that transmits the second transmission sequence,
wherein the first transmission sequence is a sequence obtained by multiplying a first code sequence by a first orthogonalized code,
the second transmission sequence is a sequence obtained by multiplying a second code sequence by a second orthogonalized code,
an inner product sum of the first orthogonalized code and the second orthogonalized code is zero,
a value obtained by multiplication of an ith element (V1$i$) of the first orthogonalized code and an ith element (V2$i$) of the second orthogonalized code is equal to an ith element of a fundamental sequence VV_2n having a length of 2n, where i and n are an integer greater than or equal to 1, and
the fundamental sequence VV_2n includes a sub fundamental sequence VV_2(n−1) having a length of n, and the fundamental sequence VV_2n is equal to {VV_2(n−1), −VV_2(n−1)} or {−VV_2(n−1), VV_2(n−1)}.

2. The multi-sector radar according to claim 1,
wherein the first transmission-sequence generating unit comprises:
a first code output unit that outputs the first code sequence;
a first orthogonalized-code output unit that outputs a first orthogonalized code generated using the fundamental sequence VV_2n; and
a first multiplying unit that multiplies the first code sequence by the first orthogonalized code and outputs the first transmission sequence, and
wherein the second transmission-sequence generating unit comprises:
a second code output unit that outputs the second code sequence;
a second orthogonalized-code output unit that outputs a second orthogonalized code generated using the fundamental sequence VV_2n; and
a second multiplying unit that multiplies the second code sequence by the second orthogonalized code and outputs the second transmission sequence.

3. The multi-sector radar according to claim 2,
wherein the first code output unit repeatedly outputs the first code sequence a plurality of times;
the first multiplying unit multiplies one of the first code sequences by one element of the first orthogonalized code;
the second code output unit repeatedly outputs the second code sequence a plurality of times; and
the second multiplying unit multiplies one of the second code sequences by one element of the second orthogonalized code.

4. The multi-sector radar according to claim 2,
wherein the first code output unit repeatedly outputs the first code sequence a plurality of times, the first code sequence including a first sub code sequence;
the first multiplying unit multiplies each of the first code sequences by one element of the first orthogonalized code one-by-one;
the second code output unit repeatedly outputs the second code sequence a plurality of times, the second code sequence including a second sub code sequence; and
the second multiplying unit multiplies each of the second code sequences by one element of the second orthogonalized code one-by-one.

5. The multi-sector radar according to claim 2,
wherein the first code output unit repeatedly outputs the first code sequence a plurality of times, the first code sequence including a plurality of first sub code sequences;
the first multiplying unit multiplies each of the first sub code sequences by one element of the first orthogonalized code one-by-one;
the second code output unit repeatedly outputs the second code sequence a plurality of times, the second code sequence including a plurality of second sub code sequences; and
the second multiplying unit multiplies each of the second sub code sequences by one element of the second orthogonalized code one-by-one.

6. The multi-sector radar according to claim 2,
wherein the first code output unit repeatedly outputs a chirp signal a plurality of times, the chirp signal serving as the first code sequence;
the first multiplying unit multiplies each of the chirp signals by one element of the first orthogonalized code one-by-one;
the second code output unit repeatedly outputs the chirp signal a plurality of times, the chirp signal serving as the second code sequence; and
the second multiplying unit multiplies each of the chirp signals by one element of the second orthogonalized code one-by-one.

7. The multi-sector radar according to claim 2,
wherein the first code output unit repeatedly outputs a third code sequence n times and repeatedly outputs a fourth code sequence n times, the third code sequence is different from the fourth code sequence;
the first multiplying unit multiplies each of the third code sequences and each of the forth code sequences by one element of the first orthogonalized code one-by-one and;
the second code output unit repeatedly outputs a fifth code sequence n times and repeatedly outputs a sixth code sequence n times, the fifth code sequence is different from the sixth code sequence; and
the second multiplying unit multiplies one of the fifth code sequences and each of the sixth code sequences by one element of the second orthogonalized code one-by-one.

8. The multi-sector radar according to claim 2,
wherein the first code output unit outputs the first code sequence for every 2n repetition counts, the first code sequence including first N codes, where N is an integer greater than or equal to 1;
the first multiplying unit multiplies one code included in the first code sequence by one element of the first orthogonalized code one-by-one;
the second code output unit outputs the second code sequence for every 2n repetition counts, the second code sequence including second N codes; and
the second multiplying unit multiplies one code included in the second code sequence by one element of the second orthogonalized code one-by-one.

9. The multi-sector radar according to claim 2,
wherein the first code output unit repeatedly outputs the first code sequence 2n×2 times, the first code sequence including first N codes, where N is an integer greater than or equal to 1;
the first multiplying unit multiplies each of 2n first code sequences by one element of the first orthogonalized code one-by-one and multiplies each of the first N codes included in each of next 2n first code sequences by one element of a third orthogonalized code one-by-one;
the second code output unit repeatedly outputs the second code sequence 2n×2 times, the second code sequence including second N codes;
the second multiplying unit multiplies each of 2n second code sequences by one element of the second orthogonalized code one-by-one and multiplies each of second N codes included in each of next 2n second code sequences by one element of a fourth orthogonalized code one-by-one;
the third orthogonalized code is obtained by multiplying a N length sequence including repeated elements (+1, −1) by one element of the first orthogonalized codes one-by-one 2n times; and
the fourth orthogonalized code is obtained by multiplying the N length sequence including repeated elements (+1, −1) by the second orthogonalized code one-by-one 2n times.

10. The multi-sector radar according to claim 2,
wherein the first code output unit repeatedly outputs the first code sequence 2n×2 times, the first code sequence including first N codes, where N is an integer greater than or equal to 1;
the first multiplying unit multiplies each first code sequence by the first orthogonalized code and by a third orthogonalized code alternately, during the multiplication of the first orthogonalized code, the first multiplying unit multiplying each of the first code sequences by one element of the first orthogonalized code one-by-one, and during the multiplication of the third orthogonalized code, the first multiplying unit multiplying each of the first N codes by one element of the third orthogonalized code one-by-one;
the second code output unit repeatedly outputs the second code sequence 2n×2 times, the second code sequence including second N codes;
the second multiplying unit multiplies each second code sequence by the second orthogonalized code and by a fourth orthogonalized code alternately, during the multiplication of the second orthogonalized code, the second multiplying unit multiplying each of the second code sequences by one element of the second orthogonalized code one-by-one, and during the multiplication of the fourth orthogonalized code, the second multiplying unit multiplying each of the second N codes by one element of the fourth orthogonalized code one-by-one;
the third orthogonalized code is obtained by multiplying a N length sequence including repeated elements (+1, −1) by one element of the first orthogonalized codes one-by-one 2n times; and
the fourth orthogonalized code is obtained by multiplying the N length sequence including repeated elements (+1, −1) by the second orthogonalized code one-by-one 2n times.

11. The multi-sector radar according to claim 9,
wherein, after repeatedly outputting the first code sequence 2n×2 times, the first code output unit repeatedly outputs a seventh code sequence 2n×2 times, the seventh code sequence is different from the first code sequence;
the first multiplying unit multiplies each of 2n seventh code sequences by one element of the first orthogonalized code one-by-one and multiplies each of the seventh N codes included in each of next 2n seventh code sequences by one element of the third orthogonalized code one-by-one;
after repeatedly outputting the second code sequence including N codes 2n×2 times, the second code output unit repeatedly outputs a eighth code sequence 2n×2 times, the eighth code sequence is different from the second code sequence; and
the second multiplying unit multiplies each of 2n eighth code sequences by one element of the second orthogonalized code one-by-one and multiplies each of eighth N codes included in each of next 2n eighth code sequences by one element of the fourth orthogonalized code one-by-one.

12. The multi-sector radar according to claim 2,
wherein the first code output unit outputs the first code sequence including first N codes, and
the second code output unit outputs the second code sequence that is a sequence in which an order of output of codes in the first code sequence are changed.

13. The multi-sector radar according to claim 1,
wherein the fundamental sequence VV_2n having a length of 2n includes one or more sets of elements having a phase difference of at least 180° each other, each set includes two elements.

14. The multi-sector radar according to claim 2
wherein the fundamental sequence VV_2n having a length of 2n includes one or more sets of elements having a phase difference of 360°/M each other, each set includes two elements, where M is an integer greater than or equal to 3.

15. The multi-sector radar according to claim 7,
wherein the third code sequence and the fourth code sequence are Spano codes.

* * * * *